May 16, 1939.  A. E. LUNDBYE  2,158,942
AUTOMATIC CONTROL FOR CONCRETE PAVERS
Filed Nov. 6, 1936   12 Sheets-Sheet 1

Inventor:
Axel E. Lundbye,
By Parker Cook.
Attorney.

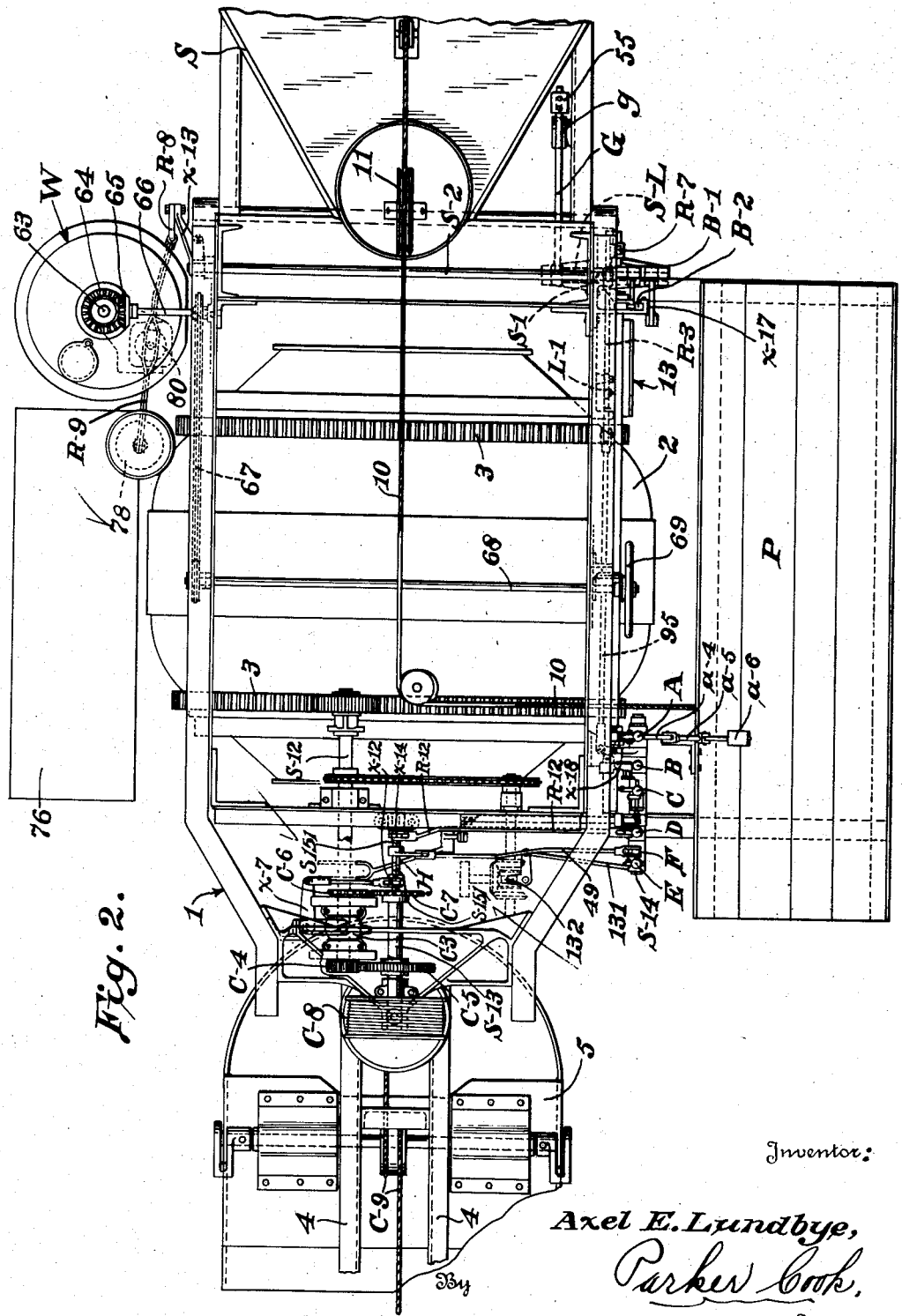

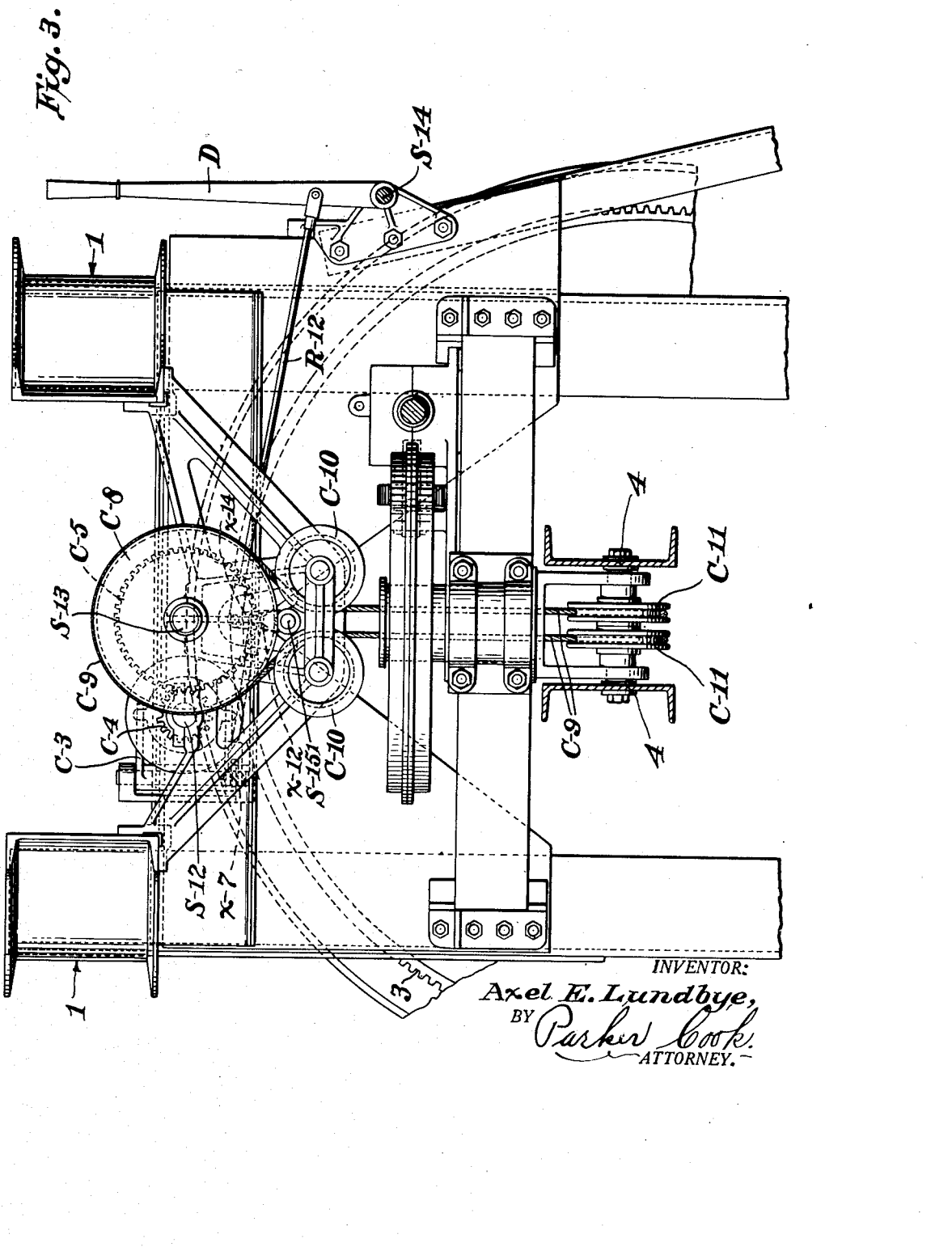

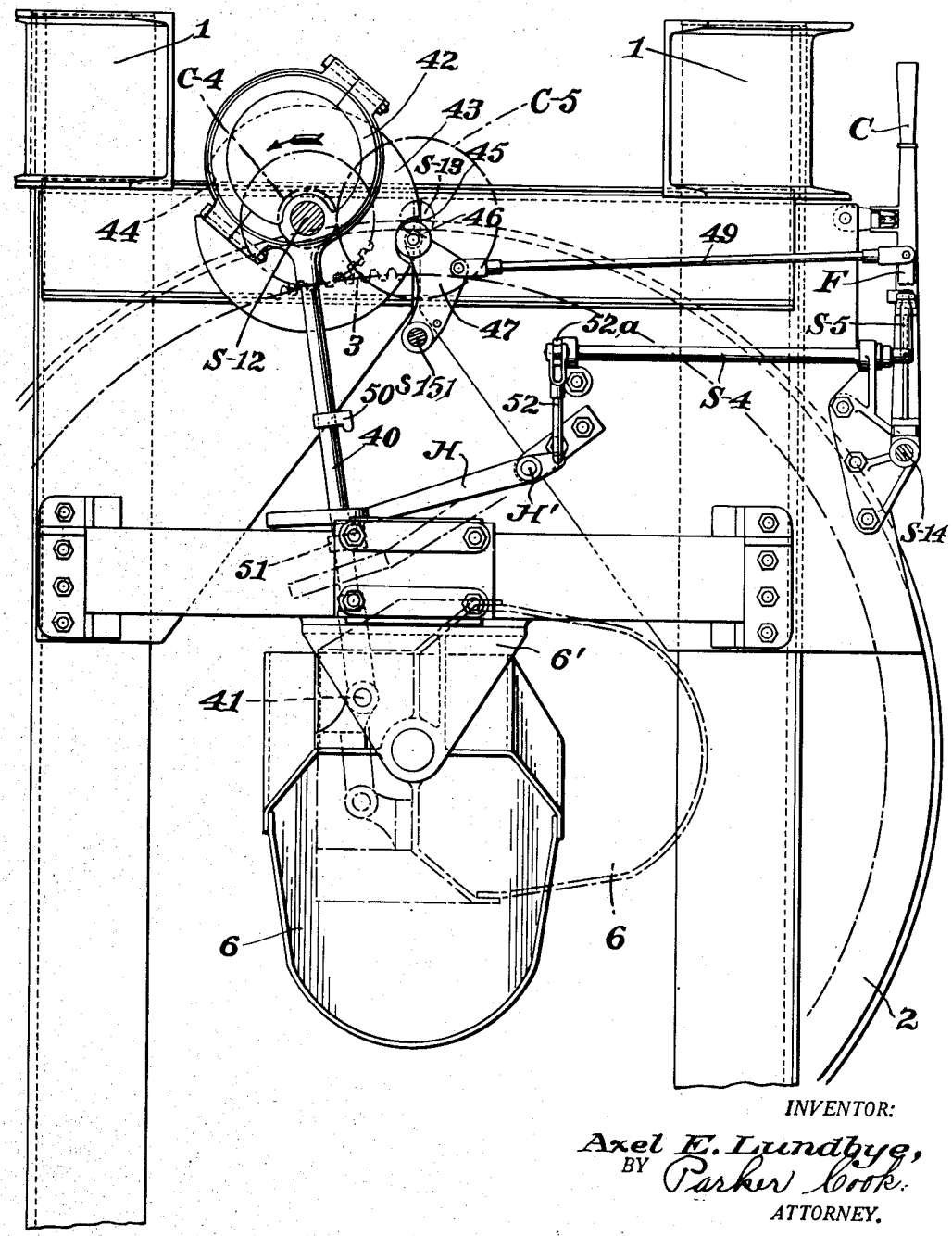

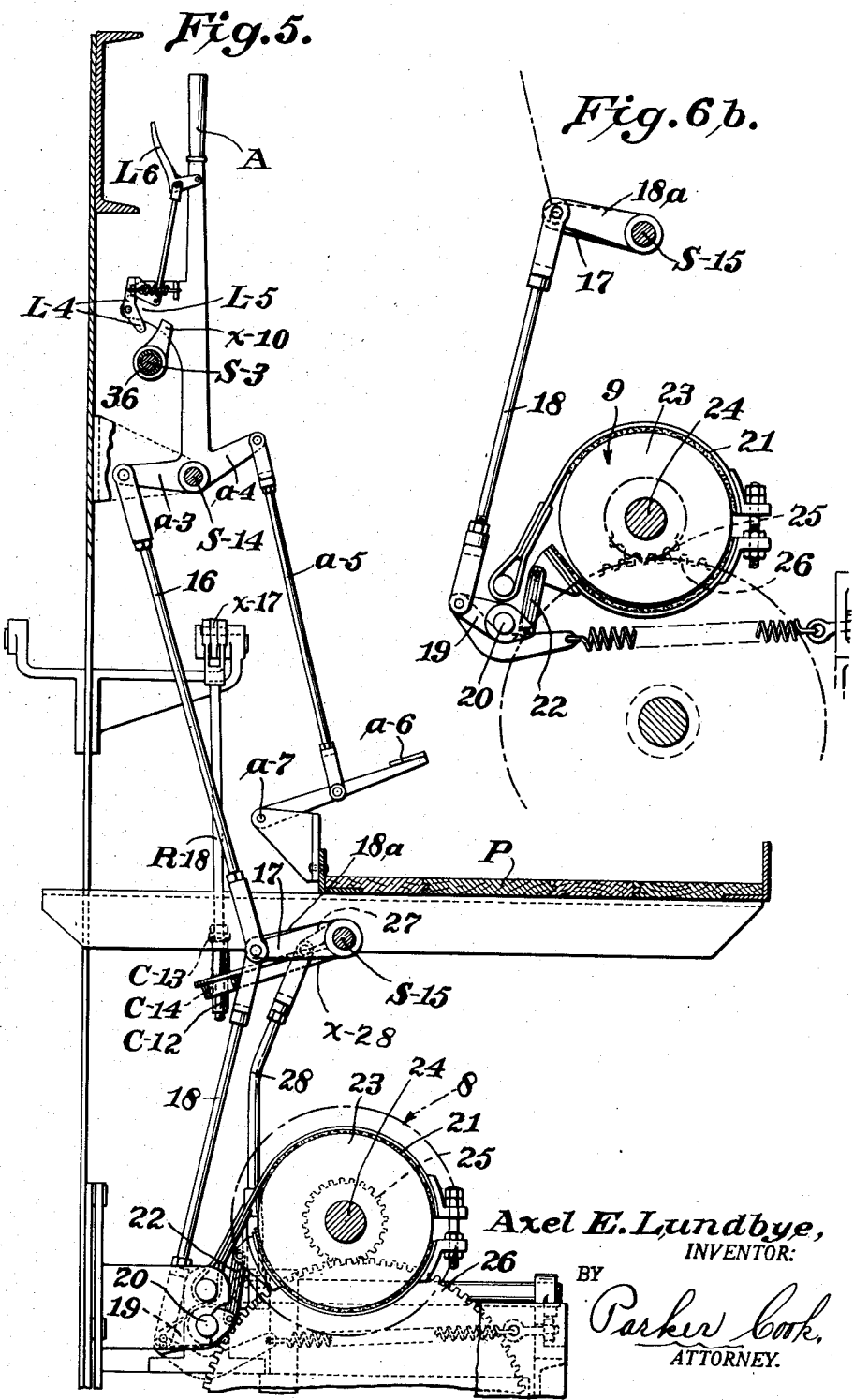

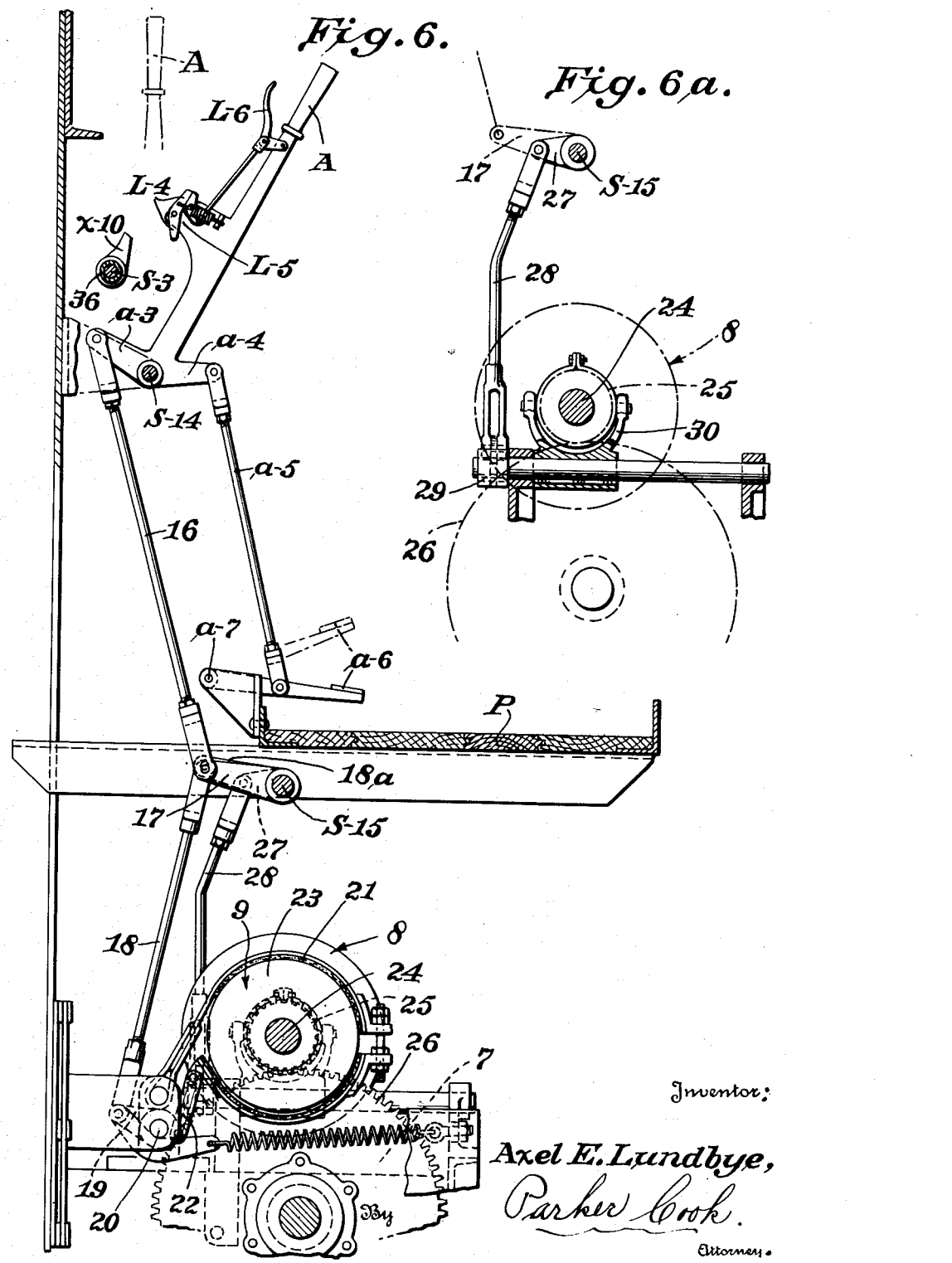

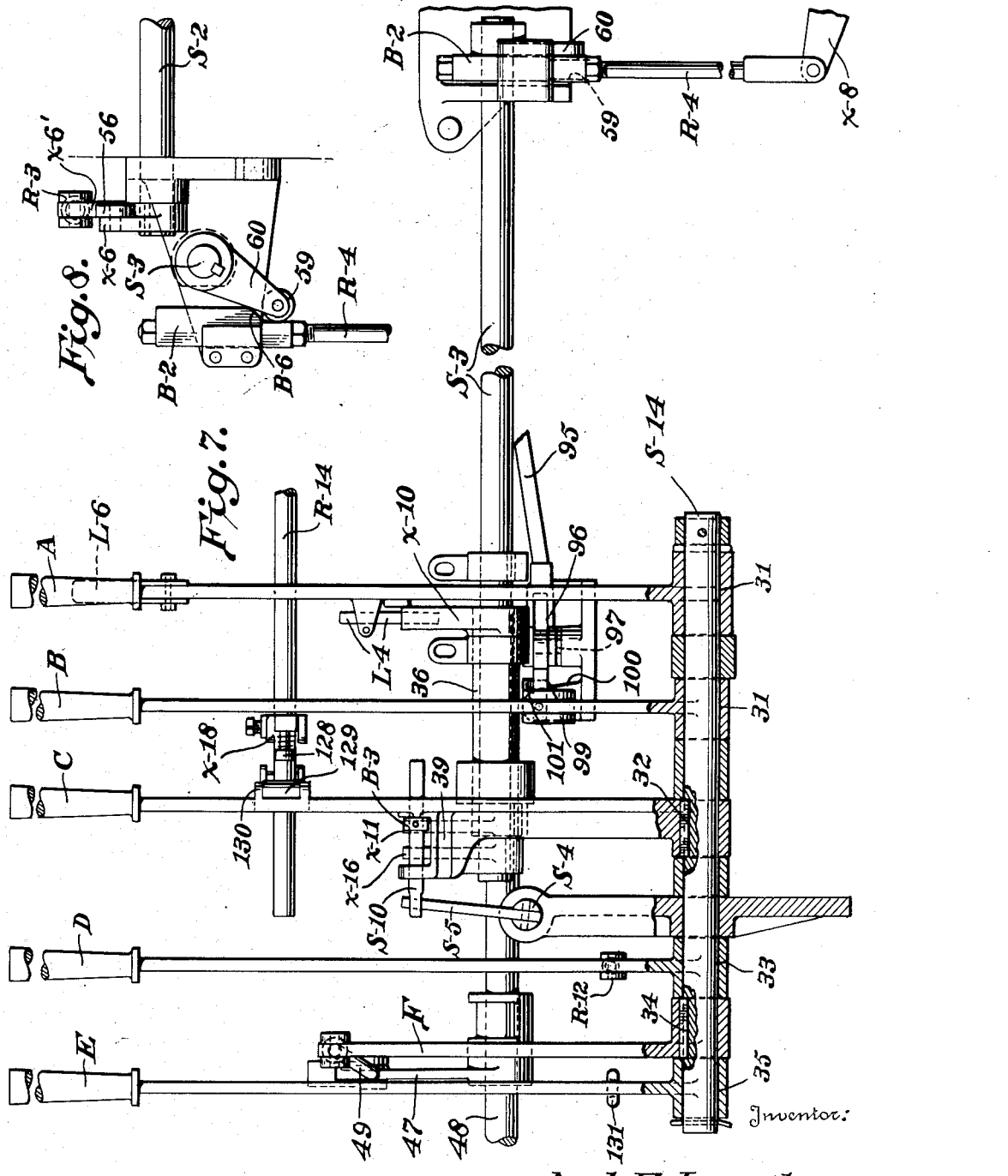

May 16, 1939.　　　A. E. LUNDBYE　　　2,158,942
AUTOMATIC CONTROL FOR CONCRETE PAVERS
Filed Nov. 6, 1936　　　12 Sheets-Sheet 8
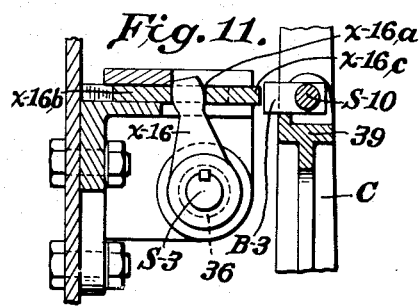
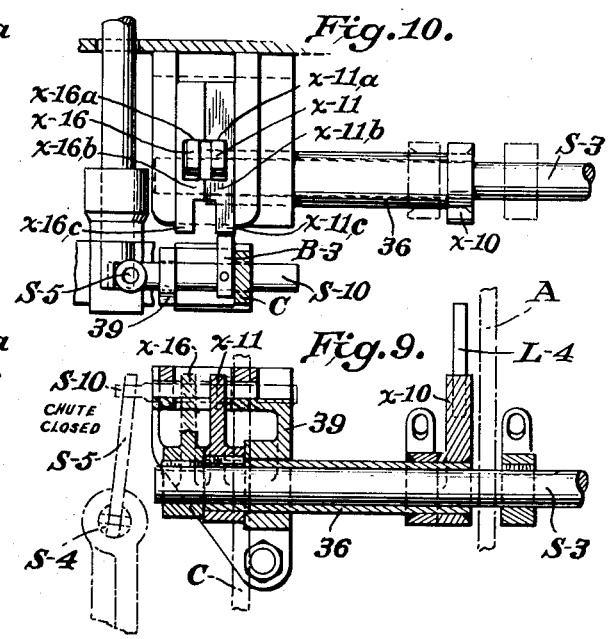
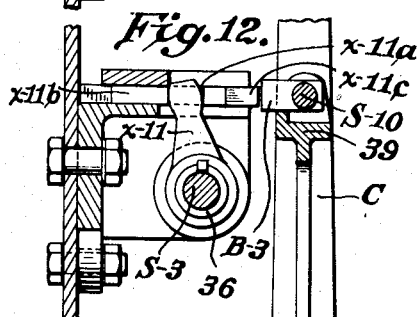
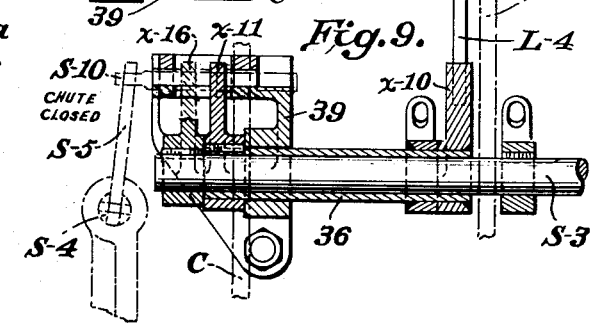
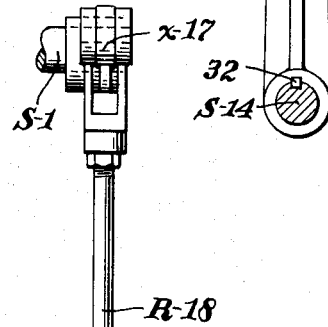
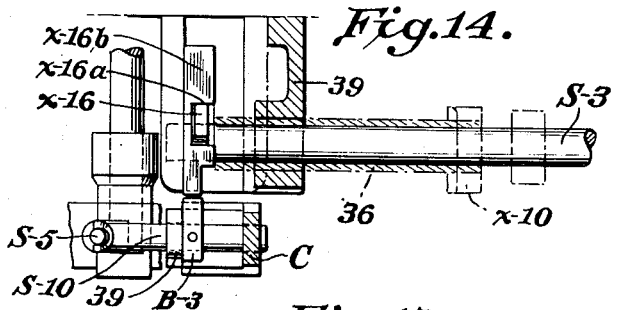
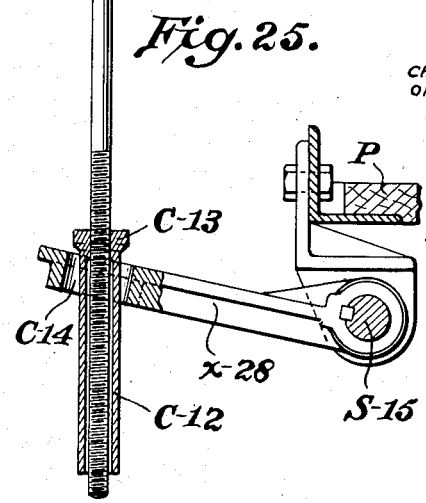
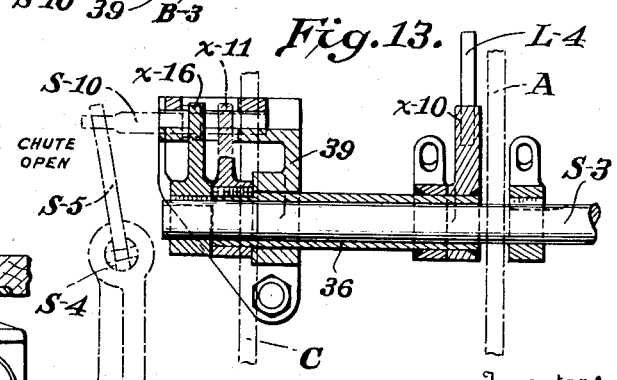
Inventor:
Axel E. Lundbye,
By Parker Cook
Attorney

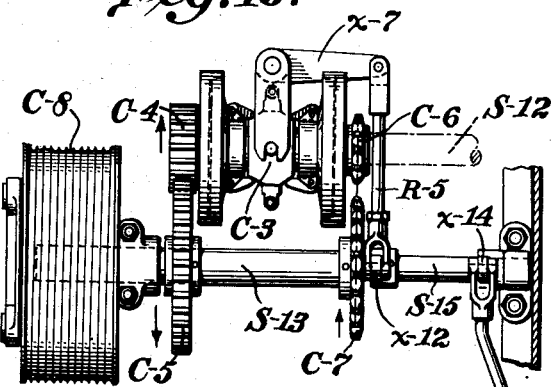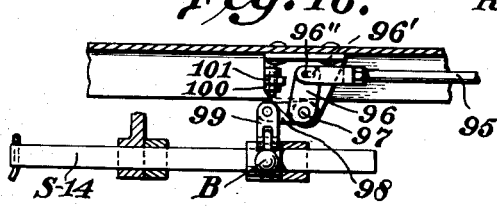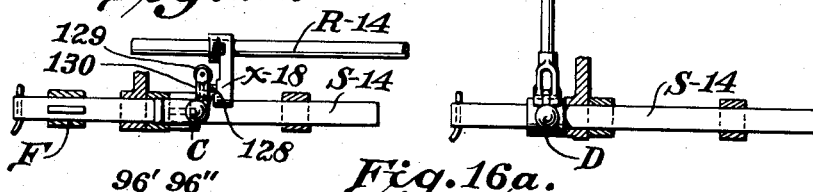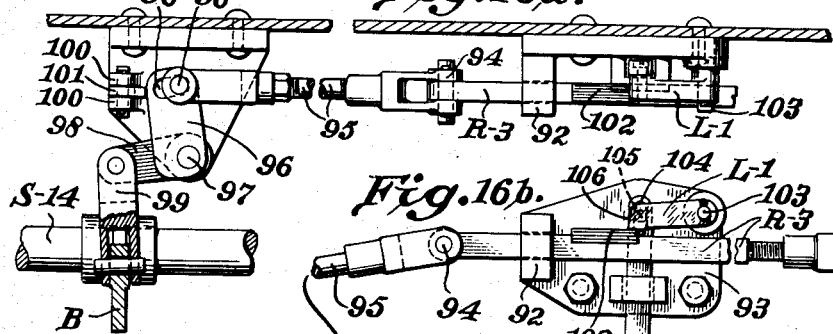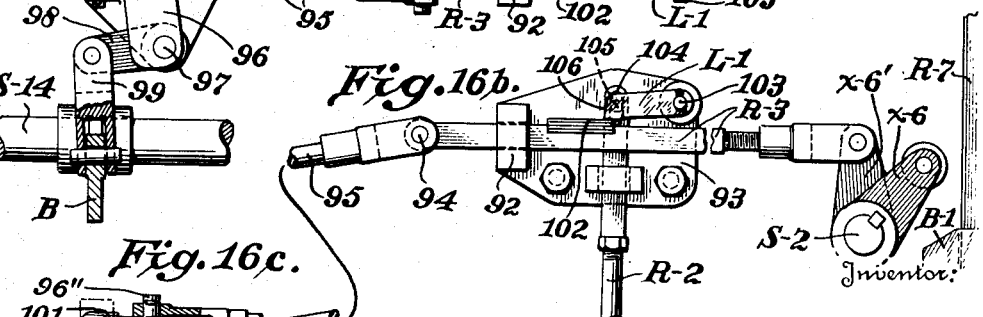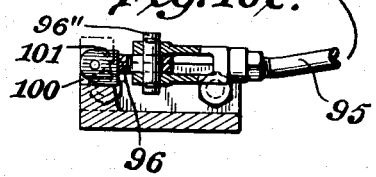

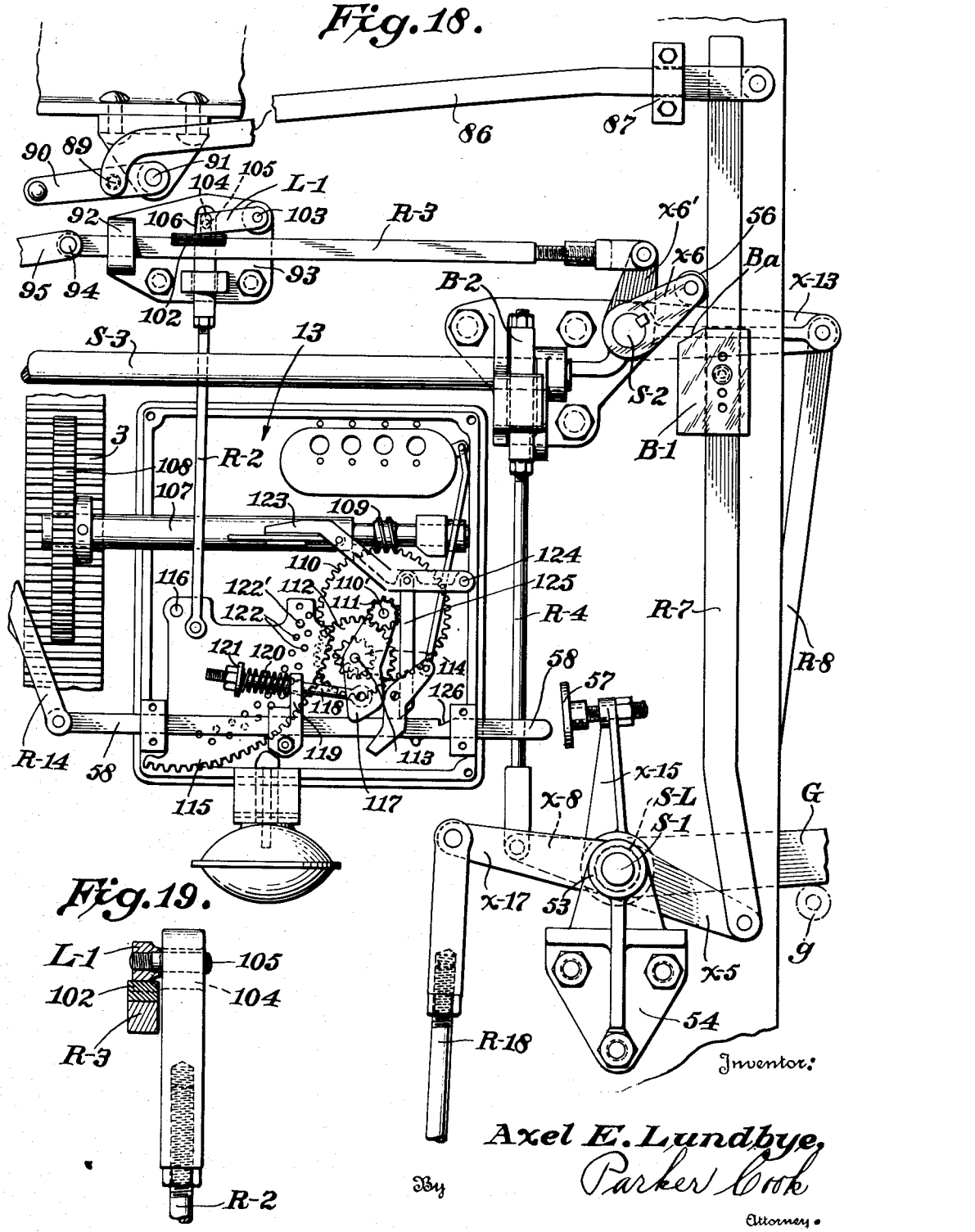

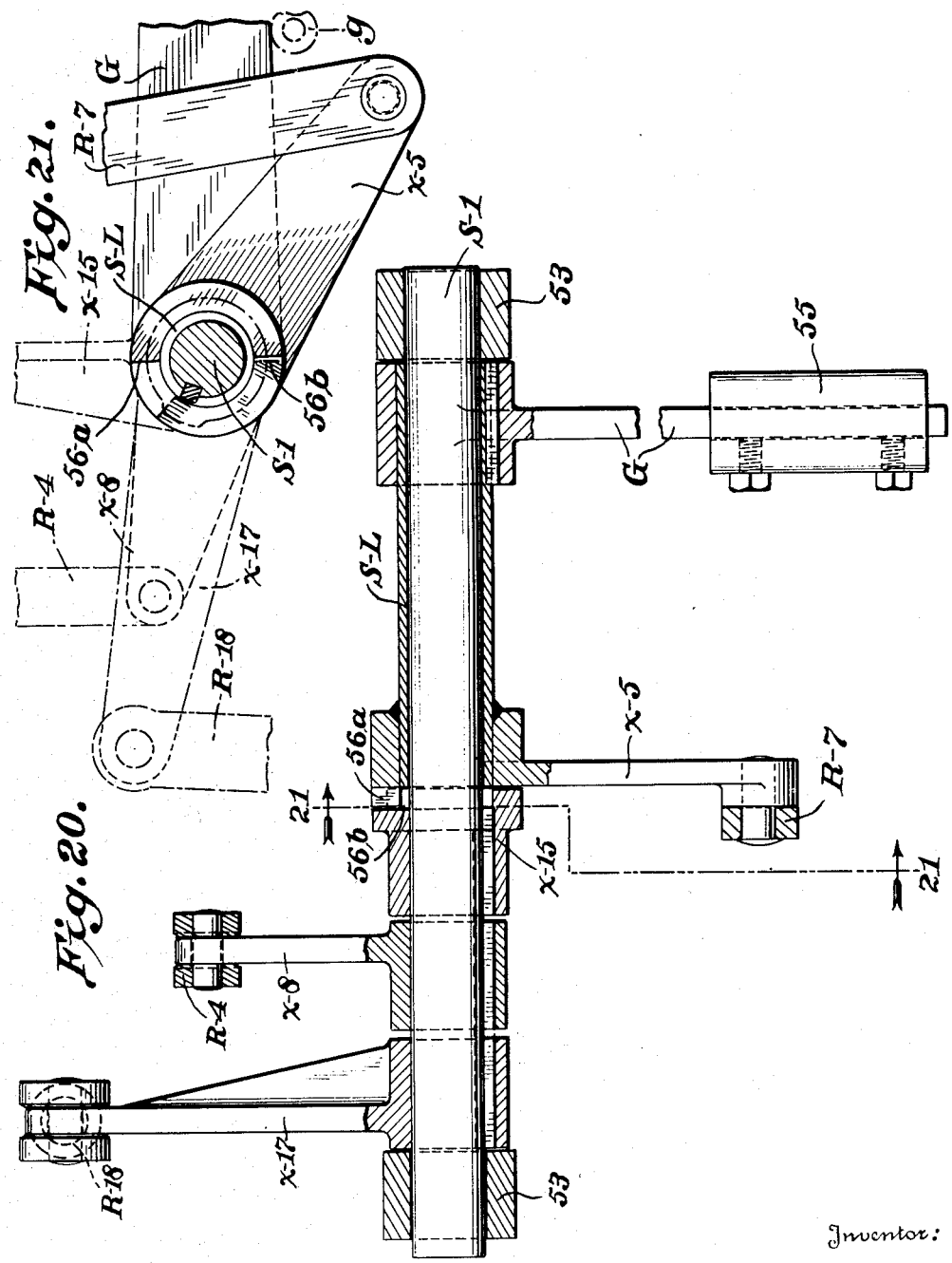

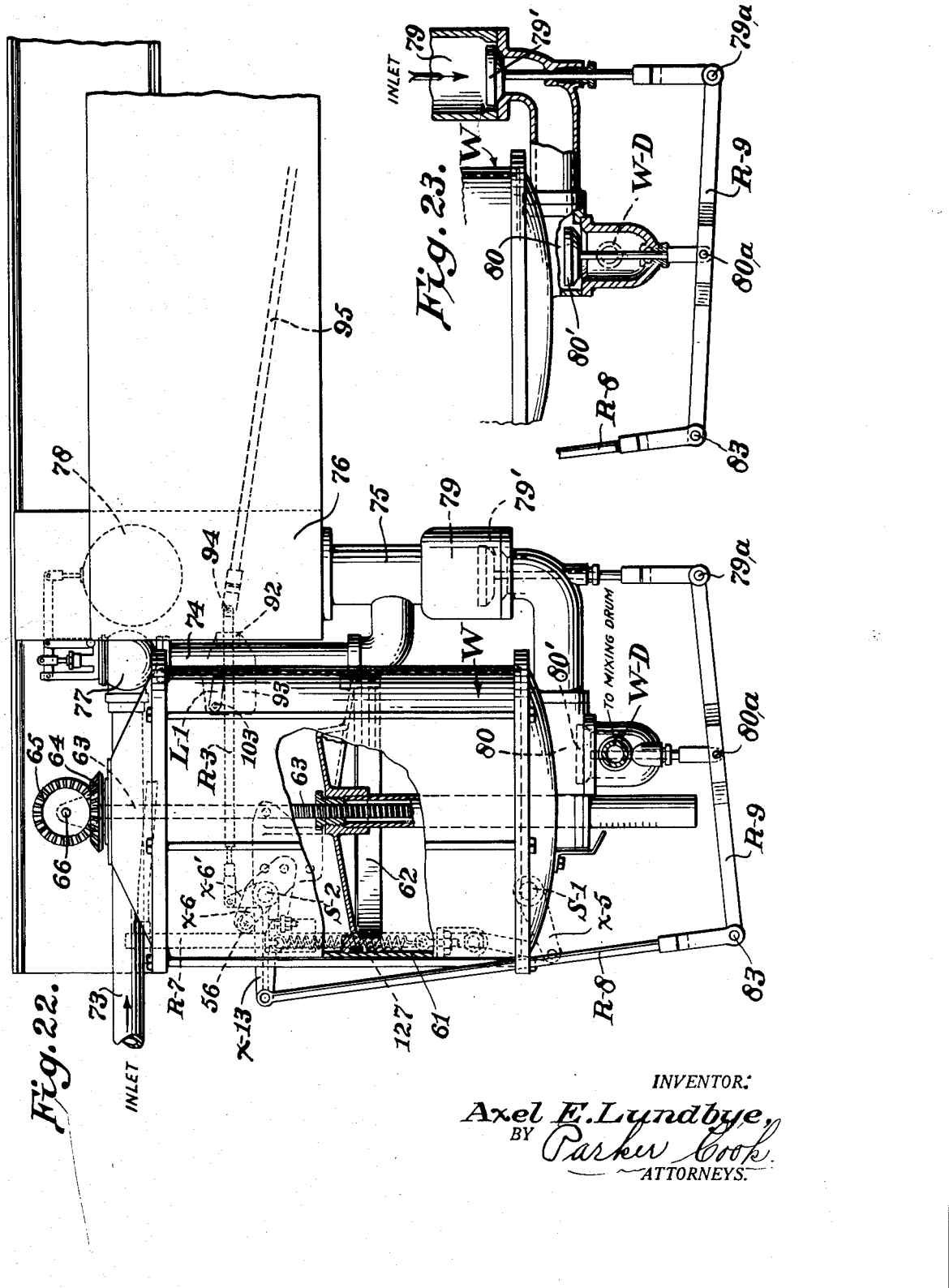

Patented May 16, 1939

2,158,942

UNITED STATES PATENT OFFICE 2,158,942

AUTOMATIC CONTROL FOR CONCRETE PAVERS

Axel E. Lundbye, Nunda, N. Y., assignor to The Foote Company, Inc., Nunda, N. Y., a corporation of Delaware Application November 6, 1936, Serial No. 109,585

21 Claims. (Cl. 259—163)

My invention relates to certain new and useful improvements in concrete pavers, and more especially to an automatic control therefor.

The invention in its broadest aspects is somewhat similar in type to the automatic control for concrete pavers set forth in the patent of George E. Blood, Number 1,879,051, of September 27, 1932.

One of the principal objects of the present invention is to provide a simplified control mechanism wherein the operation of one handle or lever will cause various mechanisms to function, so that the skip will be elevated, the water automatically supplied to the mixing drum, the batch meter set in operation and thereby lock the discharge chute in a closed position for a set period of time, lock the water control, automatically unlock the discharge chute, means for opening the same, and automatically stop the skip after it has reached its upper limit of travel.

Still another object of the invention is to so arrange the automatic control that after the cycle of operation has been completed, the skip may be manually lowered by the operation of the aforementioned handle and the automatic mechanism be again in condition for the next cycle of operation.

Still another object of the present invention is to provide an automatic control mechanism (the parts also being capable of manual operation) whereby a cycle, that is, from the raising of the skip to the discharge of the aggregates from the drum, can be completed in a minimum period without any loss between the several operations. For instance, the skip may be timed to discharge into the drum in eight and one-half seconds, while the drum can be discharged in seven and one-half seconds. Thus, the drum can be completely emptied while the skip is being elevated. In a like manner, the water tank can be controlled to empty into the drum in, say, seventeen seconds, although the batch meter for controlling the flow of water to the drum may be set to lock this control for twenty-two seconds, thus making sure that the entire amount of water in the tank will be discharged into the mixing drum within the time period.

Still another object of the invention is to provide an automatic control, as well as a manual control, which is operated by the main control lever, which, in turn, has a finger lever thereon, so that if it should be desired to operate the controls manually, this may be accomplished by simply grasping the finger lever and the aforementioned main control lever, which will prevent the automatic cycle of operations from taking place, and, thereafter, the various controls may be operated by the remaining several levers.

Furthermore, the skip is to be lowered manually by the operation of this main control lever, and this, also, is made possible by providing the finger lever on the main control lever and its attachments, as will be shortly described.

Still another object of the invention is to provide a mechanism for automatically controlling the elevation of the skip, functioning of the water control and the power discharge, and for efficiently manually controlling these operations, as well as manually controlling the inward and outward movement of the bucket on the boom and the swinging of the boom to the desired position.

It will be understood that when the term "manually controlled" is used, it denotes that the individual mechanism to be operated is caused to be set into motion by the manual moving of individual control levers, whereas when "automatic control" is mentioned, it means that after one lever is operated, various other mechanisms are automatically thrown into operation to cause other interconnected parts to function.

Still another object of the invention is to provide a simple and efficient automatic knock-out mechanism, which is automatically affected by the opening and closing of the discharge chute, by the operation of the main control lever, and by the elevation of the skip. Thus, when the discharge chute is closed, the knock-out mechanism is always in a functioning position (unless locked by the batch meter) to be operated by the automatic control lever (as well as by its own lever), whereas, when the discharge chute is open, the knock-out mechanism will be in a position to be automatically operated, not by the automatic control lever but by the elevation of the skip.

Still another object of the invention is to provide a simple and efficient knock-out mechanism for effecting the opening and closing of the discharge chute and to provide means for manually operating the opening and closing of the discharge chute whenever desired (unless locked by the batch meter).

Still another object of the invention is to provide a manual and automatic control mechanism for concrete pavers, wherein the automatic control of the cycle (that is, the elevation of the skip, the supplying of the water to the mixing drum, the locking of the discharge chute for the desired time period and the automatic unlocking of the discharge chute, as well as its opening and closing) is provided for, and, at the same time, by simply operating a finger lever, the automatic control of the cycle is cut out and the various parts may be caused to function by their respective levers, manually.

Still another object of the invention is to provide a mechanism, wherein water may be supplied to the drum for flushing the same without throwing into operation the mechanism which automatically controls the entire cycle; also to provide mechanism wherein the water control may be thrown out of operation at any time, even though the automatic control mechanism has been thrown into functioning positions.

Still another object of the invention is to so arrange the control mechanism that with but the operation (that is, the manual operation) of one lever, the aggregates will be raised and deposited in the mixing drum, the discharge chute will be closed, the water will be turned on, the batch will be mixed for the desired time period, and then the discharge chute automatically be opened.

Furthermore, with the same lever, the skip may be lowered and the automatic mechanism may be cut out by simply pressing a finger lever on this main control lever.

Still another object of the invention is to provide a set of control levers for the control of the individual mechanisms and functions of the machine, but to so arrange the control mechanism that their operation is not necessary to perform the cycle if the main control lever is operated.

Still another object of the invention is to provide an automatic control mechanism, wherein sequences can be timed so that even seconds are not lost between the various automatic operations, thereby making it possible to lay the concrete in the shortest possible time.

Still another object of the invention is to provide an automatic control mechanism, wherein the various parts may be readily applied without any material changes in the paver.

With these and numerous other objects in view, which will be pointed out as the specification proceeds, the invention consists in certain new and novel arrangements and combination of parts, as will be hereinafter more fully explained and pointed out in the claims.

Referring now to the drawings showing a preferred embodiment:

Fig. 2 is a general plan view of the paver, together with parts of the automatic control mechanism;

Fig. 3 is a front elevation of the paver shown in Figs. 1 and 2, together with the lever D and part of the mechanism for moving the bucket along the boom;

Fig. 4 is a view similar to Fig. 3, illustrating the planetary power discharge chute and the control mechanism, the discharge chute being shown in its open position and in dot and dash lines showing its closed position;

Fig. 5 is a detail elevation of the skip-operating control mechanism showing the main automatic control lever A, together with its finger lever and showing the parts in a normal or non-operating position;

Fig. 6 is a similar view with the main control lever having been moved to an operating position;

Figure 1:
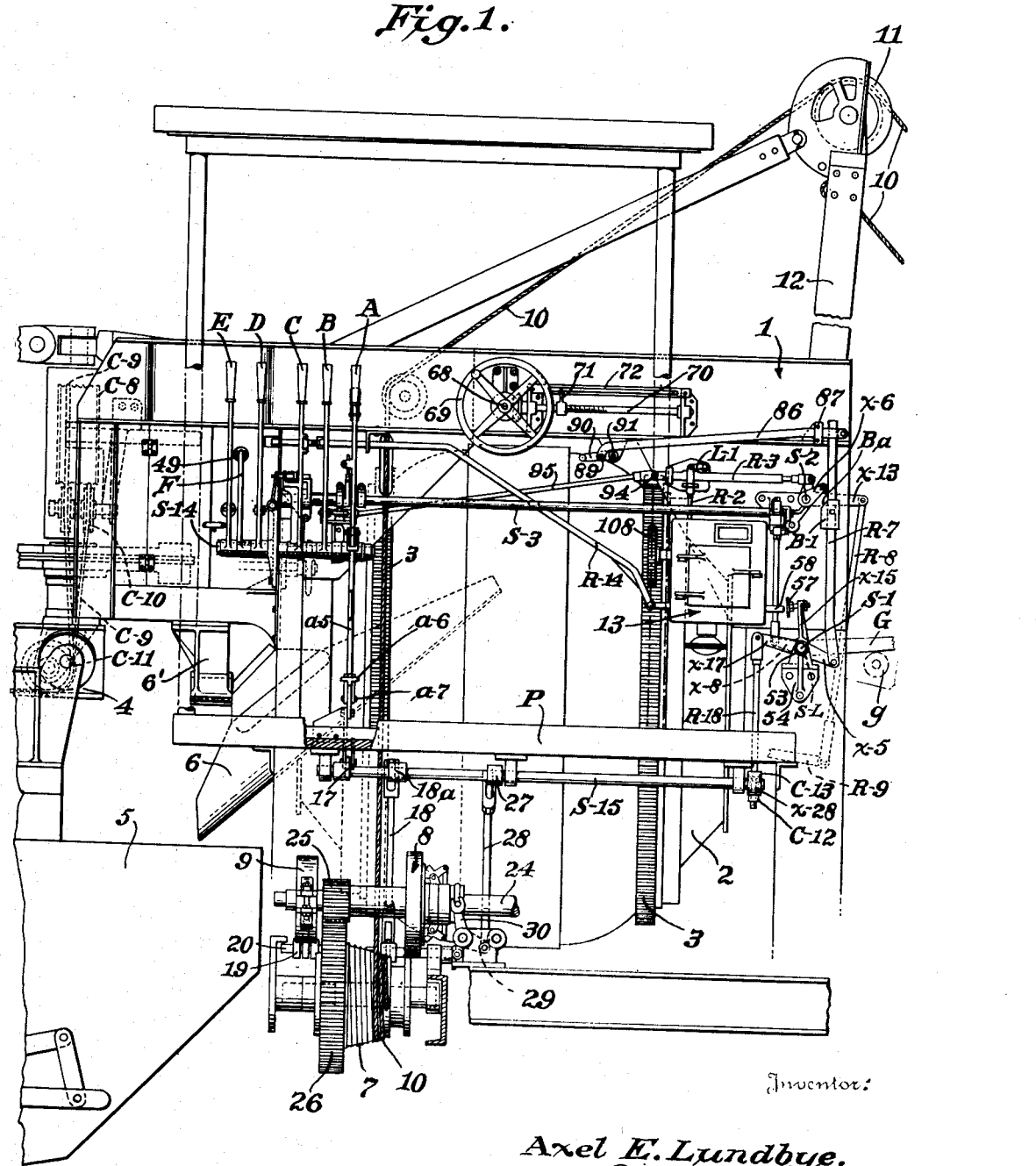
Fig. 1 is a side elevation of the control mechanism with as much of the paver and its parts as thought necessary to illustrate the present invention.

Fig. 6ª is a detail of part of the mechanism shown in Figs. 5 and 6 and showing the skip hoist clutch in its operative position;

Fig. 6ᵇ is a fragmentary detail of the brake associated with the skip hoist clutch, showing the brake in its released position;

Fig. 7 is an enlarged side elevation, partly in section, showing the various control levers, knock-out mechanism, and the shaft on which the control levers are mounted, the control mechanism being in a position to be operated by the automatic control lever A and the knock-out mechanism being in the position it assumes when the discharge chute is closed;

Fig. 8 is a fragmentary detail showing a cam and rocker arm associated with the skip for operating the knock-out mechanism during the elevation of the skip;

Fig. 9 is a fragmentary detail section of the knock-out mechanism, showing the position of the knock-out mechanism parts when the discharge chute is in a closed position;

Fig. 10 is a similar top plan view of the same;

Fig. 11 is a fragmentary detail section of the finger keyed to the shaft for operating a part of the knock-out mechanism;

Fig. 12 is a similar view of a similar finger, but keyed to a sleeve, for operating the same part of the knock-out mechanism;

Fig. 13 is a fragmentary detail sectional view similar to Fig. 9, showing the arrangement of the parts of the knock-out mechanism when the discharge chute is in an open position;

Fig. 14 is a top plan view of the same;

Fig. 15 is a fragmentary detail view, showing the means for controlling the inward and outward movement of the bucket along the boom;

Fig. 16 is a fragmentary detail of the control for the manual operation of the water, showing a throw-over stop whereby the control may be operated without locking the same with relation to the batch meter;

Fig. 16ª is a view similar to Fig. 16 slightly enlarged and additionally showing the rod from the water control associated with the lock from the batch meter;

Fig. 16ᵇ is a side elevation of the lock arrangement from the batch meter, showing the latch in an unlocked position;

Fig. 16ᶜ is a detail view showing the throwover stop connected with the manual water control mechanism, as shown in Figs. 16, 16ª and 16ᵇ, to permit a flushing of the mixing drum without locking the water control with relation to the batch meter;

Fig. 17 is a detail of the throw-over stop and mounting therefor, the throw-over stop being in inoperative position;

Fig. 18 is a front elevation of the batch meter with the door removed and its connections with the water control, discharge chute, and skip;

Fig. 19 is a detail section of the latch mechanism, shown in Figs. 16ª and 16ᵇ;

Fig. 20 is an enlarged detail sectional plan view showing the sleeve, shaft, clutch, and arms, all operated by the elevation of the skip, and taken along the shaft S—I, Fig. 1;

Fig. 21 is a sectional elevation on the line 21—21 of Fig. 20;

Fig. 22 is a detail view of the water tank and its various connections, parts being broken away for the sake of clearness;

Fig. 23 is a detail of the lower portion of the water tank with the valves being shown in the reversed position to those shown in Fig. 22;

Fig. 24 is a fragmentary detail showing the locking mechanism associated with the batch meter for preventing the movement of the power discharge chute lever until the batch meter releases the same; and Fig. 25 is a detail showing a connection between the skip and the skip hoist for throwing out the skip hoist clutch and applying the brake.

At the outset, it might be mentioned that the planetary discharge per se is not a part of the present invention and is shown and described in detail in the patent granted to Charles E. Foote on November 10, 1925, Number 1,561,144. Likewise, the water tank, with but a few changes, is shown and described in Patent Number 1,879,051, granted September 27, 1932, to George E. Blood. Also, the batch meter, with but one or two changes, is shown in the patent granted to Charles E. Foote, Number 1,419,451, on June 13, 1922, while in the patent of George E. Blood, Number 1,879,051, a knock-out and control mechanism of the same general type for a paver is shown and described.

It will also be understood that the present invention relates to the control of the various parts of the concrete paver, so that from the moment the aggregates are elevated in the skip until the time they are discharged from the discharge chute, the operations are automatically controlled by the initial movement of the main control lever and the continued rise of the skip.

It will further be understood that only as much of the paver is shown and described as thought necessary to have a full understanding of the present control mechanism.

As is well known to those skilled in the art, in the operation of a concrete paver, various mechanisms have been tried, wherein, after the skip has been started in its upward movement, the water supply is automatically turned on, the discharge chute is locked against opening until the drum has rotated a predetermined number of times, or, in other words, a predetermined amount of time, this being possible through the provision of a batch meter, after which period of time the discharge chute is unlocked, so that the aggregates may then be discharged into the bucket to be run out along the boom.

The present control mechanism is also so arranged that besides these features being automatically started by the operation of one lever, as will be hereinafter explained in detail, the several mechanisms may also be operated and controlled manually, the automatic control being thrown out of operation by simply grasping a finger lever while operating the main control lever.

THE INVENTION IN GENERAL

The present control mechanism for the paver is featured by five separate levers, consisting of, first, the hand lever A, which is the main control lever and initiates the movement of the skip hoist and automatically starts various other mechanisms in certain timed relation; second, the lever B for manually operating the water control; third, the lever C for manually operating the power discharge, which lever is also affected at certain times by the movement of the lever A; fourth, the lever D for manually operating the bucket drive; and, fifth, the lever E for traversing the boom.

Also, there is always provided means for elevating the boom, but this forms no part of the present invention.

In the automatic control mechanism, about to be described, there are, from the initial movement of the skip until the time that the aggregates are discharged from the drum into the bucket, a number of parts that go into and out of operation, such as knock-out mechanisms, release setting mechanisms, and various other automatic controls, which will be shortly described more in detail.

Referring now for the moment, generally, to the paver and to Fig. 1, there are shown a superstructure 1, the conventional mixing drum 2, with its ring gears 3, which are driven from pinions on the main power shaft connected with the engine 10 (not shown) on the paver.

There are also shown a portion of the inner end of the boom 4 and the cable drum C—8 extending outwardly over the inner end of the boom for running the bucket 5 inwardly and outwardly along the boom.

This is accomplished by running the bucket cable drum C—8 in a clockwise or anti-clockwise direction, which will be explained more in detail hereinafter (see Figs. 3 and 15).

There may also be seen in Figs. 1 and 4 the power-operated discharge chute 6, which, in Fig. 4, is in its open position. This discharge chute is operated by a planetary discharge mechanism, which mechanism is shown in the patent referred to, Number 1,561,144, granted to Charles E. Foote.

Still referring to Fig. 1, there may be seen a skip hoist cable drum 7 for operating the skip S, together with the clutch 8 for throwing into and out of operation this skip hoist drum 7. There is also provided the brake 9, which is always engaged when the clutch is thrown into its inoperative position. The cable 10 extends from the skip hoist drum 7 upwardly over the sheave 11 carried by the frame 12 and is attached to the skip S so that when the cable is wound on the drum, the skip will be elevated, and when the cable unwinds or pays off, the skip will be lowered in the well known manner.

In Fig. 1, there may be seen the outline of the batch meter, shown generally as at 13 and in detail in Fig. 18, which batch meter is illustrated in the Patent Number 1,419,451, heretofore mentioned, of Charles E. Foote. However, there have been additional functions added to the batch meter, which will be described as the specification proceeds.

Still referring to Fig. 1, there may be seen the operator's platform P, while conveniently positioned for the operator are the heretofore-mentioned levers A, B, C, D, and E, all of which are mounted at their lower ends on the shaft S—14, certain of the levers being keyed to the shaft and others being loosely mounted thereon, as will be hereinafter mentioned.

There will also be seen the lower shaft S—15, which is operated in a clockwise direction, as will be hereinafter mentioned, by the movement of the lever A to initiate the movement of the skip and be returned to its normal position (anti-clockwise movement) by the upward movement of the skip, as will be shortly described. It is from this shaft S—15 that the clutch 8 for operating the skip power drum 7 and the brake 9 are actuated.

*Elevation of skip*

Having thus described the above-mentioned parts generally, reference is now made to Figs. 5 to 8, inclusive, which illustrate the hand lever A and its various connections and parts as associated with, first, the skip hoist drum 7, clutch 8, and brake 9.

It also might be mentioned that the operation of this lever A sets into operation the various automatic control mechanisms, unless the finger lever is operated during the movement of the lever A, which would cut out the automatic control mechanism, but this automatic mechanism will be described later.

Referring now specifically to Fig. 5, there is seen the hand lever A loosely mounted on the aforementioned shaft S—14. The lower end of the handle A is provided with the oppositely extending short arms a—3 and a—4. Connected to the outer end of the arm a—3 is the rod 16, which, in turn, is connected at its lower end to the forward end of the arm 17, which, in turn, is fixed to a lower shaft S—15, which extends just below the platform P.

The shaft S—15 also has an adjacent arm 18a thereon, to which, in turn, is connected the rod 18, which extends downwardly and connects to the arm 19 fixed on the shaft 20 to thus operate the brake band 21 through the link 22. The brake band 21 works in conjunction with the brake drum 23, which is mounted on the power shaft 24, from which power shaft is driven the skip hoist drum 7 through the reduction gearings 25 and 26; also, the heretofore-mentioned clutch 8 is mounted on the power shaft 24, as may be seen in Fig. 1.

Farther along the shaft S—15 is the arm 27, to which is connected the rod 28, the lower end of which rod is fixed to an arm 29 of the spanner 30, which operates the heretofore-mentioned clutch 8.

It might be mentioned here that the brake 9 on the power shaft operates slightly in advance of the clutch 8 for the skip hoist, so that if the operator moves the handle A but slightly back and forth, rather than pulling it all the way, he can keep releasing the brake without actuating the clutch to thus lower the skip by gravity.

Still referring to Fig. 5, it will be noticed that to the short arm a—4, there is a supplemental rod a—5 pivoted at its lower end to the foot pedal a—6, which is pivoted, as at a—7, so that the operator may use both his hand and foot in the manipulation of this main control lever A or may use either one or the other.

As far as the description has proceeded, it will be understood that when the lever A is pulled (disregarding for the moment the automatic arrangement about to be described in connection with the shaft S—3), the shaft S—15 will be rocked in a clockwise direction (Fig. 5) to throw into operation the clutch 8 and, at the same time, release the brake band 21, which will cause the elevation of the skip S through the rotation of the drum 7, thus winding up the cable 10 that is connected to the skip.

After the skip has been elevated, it may be lowered by a slight in and out movement of the main control handle A to thus momentarily release the brake band 23 without actuating the clutch 8.

It might be mentioned that as the skip approaches its uppermost limit of travel, the shaft S—15, through a mechanism shortly to be described, is again automatically rocked in the opposite direction to release the clutch 8 and apply the brake to thus hold the skip in its uppermost position until lowered by the operator, as just described.

Thus, it will be seen that the skip is started in its elevation by the operation of the handle A and that it is always lowered by an operation of the handle A and that as it reaches its uppermost limit of travel, a clutch is automatically operated for stopping the winding of the skip hoist drum and a brake applied.

Control levers

Referring for the moment to Figs. 1 and 7, there will be seen the heretofore-mentioned shaft S—14, on which the various levers A, B, C, D, and E are mounted. The lever A, which is the main control lever, is the one that is used for lowering and elevating the skip, as just described. It also throws into operation the automatic control mechanism, about to be described.

Both the levers A and B, the first being the main control lever and the second being the lever for manually controlling the water, are loosely mounted on the shaft S—14, as at 31 (Fig. 7). The lever C, however, which is used for opening and closing the power discharge manually or to operate it automatically, is keyed to the shaft S—14, as at 32. The lever D for manually operating the bucket drive, that is, for manually setting into operation the clutch for running the bucket outwardly and inwardly of the boom, is loosely mounted on the shaft S—14, as at 33.

There is also a short arm F interposed between the lever D and the lever E (not provided with a handle), and this arm F is keyed to the shaft S—14, as at 34. The lever E is loosely mounted, as at 35, on the shaft S—14 and is used to control the traversing of the boom.

Thus, on the shaft S—14, we have the levers A, B, D, and E loosely mounted, while keyed to the shaft, we have the power discharge control lever C and the short arm F.

It is to be remembered, therefore, that whenever the lever C is operated, either manually or by the operation of lever A or the raising of the skip (as will be explained), it will rock the shaft S—14 and will also rock the short arm F, as this lever and arm are both keyed to the shaft S—14, as just pointed out.

Knock-out mechanism

Now still referring to Fig. 7 and also to Fig. 5, there will be seen another shaft S—3, which extends behind the said levers, and mounted on this shaft behind the levers A to C is the sleeve 36, on which there is rigidly mounted the short arm x—10 that is to be engaged by a pawl L—4 mounted on the small extension L—5 formed on the rear of the main control lever A. This pawl L—4, in turn, is operated from the finger lever L—6 pivoted just below the handle on the lever A. Thus, when the finger lever L—6 is grasped, it will cause the pawl L—4 to elevate, so that a rearward movement of the handle will permit the pawl L—4 to pass above the arm x—10 in an idle movement.

Should, however, the lever A be pulled without grasping the finger lever L—6, the pawl L—4 will engage the arm x—10 and cause it to rock in a clockwise direction. Inasmuch as the arm x—10 is mounted on the sleeve 36, it will also cause the sleeve to rock in a clockwise direction.

Referring now to Figs. 7 and 9 to 13, inclusive, showing the knock-out mechanism associated with the levers A and C, there will be noticed mounted on the left end of shaft S—3 the control finger x—16 (clearly shown in Fig. 11), this finger being rigidly keyed to the shaft.

Also rigidly keyed to the sleeve 36 mounted on the shaft S—3, which terminates just short of control finger x—16, is the finger x—11. Thus, if the shaft S—3 is rocked, it will rock the finger x—10, whereas if the sleeve 36 is rocked, it will rock the finger x—11.

It will be recalled that the short arm x—10 is mounted on the sleeve 36, so that when the short arm x—10 is rocked by a movement of the lever A, it will turn the sleeve 36 and rock the just-mentioned finger x—11.

In Fig. 10, a top plan view of the parts, there will be seen the tops of the two fingers x—11 and x—16, each of which fits within its respective slide, that is, x—11 fits within a notch x—11a of the slide x—11b, whereas the finger x—16 fits within a notch x—16a formed in the slide x—16b. These slides have, respectively, a projecting nose x—11c and x—16c.

Now, formed on the lever C is a bracket 39 through which there is adapted to slide the short pin S—10. On this short pin is the small block B—3, which will always be either in front of the nose x—11c or the nose x—16c of the slides x—11b and x—16b. When either of these slides contacts with the block B—3, which, it will be remembered, is mounted on the sliding pin S—10, it will throw the lever C in the same manner as if it were grasped manually and thrown.

It will also be remembered that the lever C can be manually operated at any time except when locked by the batch meter, but it is to be automatically operated either by the movement of the lever A through the sleeve 36 and the finger x—11 or by the rocking of the shaft S—3, which, as will be mentioned later on, is caused by the elevation of the skip, which will, in turn, rock the finger x—16 and, through the block B—3, when it is in front of the nose x—16c, operate the lever C. It is the lever C, it will be remembered, which is keyed to the shaft S—14, as is the arm F, which latter is connected with the planetary power discharge, to be shortly mentioned.

Although the planetary power discharge mechanism has not yet been explained, the automatic control will be more readily understood if it is kept in mind that when the small sliding block B—3 is in front of the finger x—11 and its slide, as shown in Figs. 7, 9, and 10, the power discharge chute is in its closed position, while when the pin S—10 and its sliding block B—3 is in the position shown in Figs. 13 and 14, in front of the finger x—16 and its slide, the power discharge chute is always in its open position.

*Power discharge chute and mechanism*

Reference will now be made to the power discharge chute and its connections with the aforementioned lever F, which, it will be remembered, is keyed, as at 34, to the shaft S—14. Also, the connection between the power discharge and the sliding pin S—10 associated with the automatic knock-out mechanism will be referred to.

Referring for the moment, therefore, to Fig. 4, the planetary discharge chute is shown in full lines in its open position, and this discharge mechanism per se is shown in the patent to George E. Blood, number 1,879,051, and also in the patent to Charles E. Foote, number 1,561,144. Generally speaking, it consists of the chute 6 (see Fig. 1) extending up into the drum and is mounted in the pivot bracket 6'. The chute is designed to rock into an open or closed position through the movement of the pitman rod 40 connected at its lower end 41 to the chute and at its upper end to the eccentric 42. Also, there is the disc 43 associated with the eccentric, which is cut out, as at 44 and 45, as explained in the aforementioned United States Letters Patent.

Into these notches 44 and 45 fits the small roller 46 mounted on the arm 47, which is pivoted, as at S—15, this arm and roller being, in turn, controlled through the rod 49 connected to the arm F keyed to the shaft S—14.

Power means (not shown) are connected to the shaft S—12, on which the disc 43 and eccentric 42 are mounted, so that when the lever C is pulled outwardly, it will, through the arm F and rod 49, disengage the roller 46 from the notch 45 and let the disc make half a revolution, which, in turn, will carry the eccentric around to its lowermost position and thus swing the chute to a closed position, all of which latter is explained in detail in the aforementioned Letters Patent.

There will also be noticed the forked arm H through which passes the aforementioned rod 40, and likewise, the stops 50 and 51 mounted, respectively, above and below the forked arm H to engage the arm H and raise or lower it with the opening and closing of the chute.

As shown in Fig. 4, the chute being open will have raised the arm H upwardly to the position shown.

Now, the other end of the arm H is connected by the link 52 to a short arm 52a mounted on one end of the shaft S—4, and this shaft S—4 is pivotally connected to a short link S—5, which, in turn, is loosely connected to one end of the sliding pin S—10. By pivoting the link S—5, it may swing outwardly when the lever C is actuated and may also rock when the shaft S—4 is rocked.

As just mentioned, when the chute 6 has swung to its open position, it has elevated the outer end of the arm H, which, being pivoted at H', has lowered the link 52, and through the arm 52a has rocked the shaft S—4 in an anti-clockwise direction and will have pulled the sliding pin S—10 from the position shown in Figs. 7 and 9 to the position shown in Fig. 13. Thus, it will be seen, as has already been mentioned, that whenever the chute is in its open position, the sliding pin S—10 is in its outermost position, as shown in Fig. 13, and the block B—3 will be in front of the sliding block x—16b, which, it will be remembered, is operated by the finger x—16 keyed to the shaft S—3.

It will also be understood that when the lever C is again operated, the roller 46 will be pulled from the notch 45 and the disc revolved until the roller 46 falls in the notch 44. The eccentric would then lower and revolve the chute 6 to a closed position, while the stop 50 would press the arm H downwardly, which would force the link 51 upwardly and, in turn, revolve the shaft S—4 in a clockwise direction to, in turn, revolve the link S—5 in a clockwise direction and push the sliding pin S—10 inwardly, so that the block B—3 on the pin S—10 would now be in front of the slide x—11b and be in a position to be operated by a rotation of the sleeve 36 on the shaft S—3 through the movement of the finger x—11.

As far as the specification has proceeded, it will be seen that the manual operation of the lever C will either open or close the power discharge chute, that is, if the discharge chute is in an open position, the movement of the lever will close it, whereas if the chute is in a closed position, the movement of the lever will open it, due to the fact that the lever C and the arm F connected with the planetary discharge mechanism are both keyed to the shaft S—14.

Again, an operation of the lever A, that is, the main control lever, will also, through the automatic knock-out mechanism (that is, the sleeve 36, the finger x—11 and the block B—3), move the lever C and open the discharge chute 6, provided the discharge chute is in a closed position when the lever A is operated.

However, should the chute 6 be in its open position, the block B—3 would then be over in front of the finger x—16, and consequently, there would be no movement of the lever C, nor a rocking of the shaft S—14, nor a movement of the arm F, and, therefore, the chute would not be affected.

It is to be remembered, however, that a rocking of the shaft S—3, on which the sleeve 36 is mounted, will affect the automatic mechanism, should the block B—3 be in front of the finger x—16 (chute in its open position). The rocking of the shaft S—3 (not the sleeve) is caused by the elevation of the skip, as will be shortly described.

As has just been mentioned, the elevation of the skip rocks the shaft S—3 (Fig. 7), to which, it will be remembered, the finger x—16 is fastened. Should the discharge chute be open, the block B—3 will be in front of the finger x—16, which, in turn, would cause a movement of the handle C and, in turn, rock the shaft S—14 and, through the arm F, draw the roller 46 from the notch 45, permitting the planetary to turn a half turn and swing the chute to a closed position and, in turn, revolve the rod S—4 and, through the link S—5, shoot the pin S—10 back, so that the block B—3 will be in front of the sliding block x—11b and its finger x—11.

The rocking of the shaft S—3 is caused by the elevation of the skip S but only after the skip has been elevated and turned a sleeve through twenty two and one-half degrees. A description of the sleeve and shaft, which is operated by the elevation of the skip, will now be set forth in detail.

It might also be mentioned that the rocking of the sleeve and shaft, about to be described, also controls the discharging of the water to the mixing drum, operates the automatic knock-out mechanism, sets into operation the batch meter to lock the discharge mechanism, and throws out the clutch and puts on the brake for the skip hoist.

*Shaft and sleeve operated by the skip*

The shaft S—1 and the sleeve S—L may be seen in Fig. 1, just below the batch meter, and may also be more clearly seen in Fig. 18 and (in the enlarged views) Figs. 20 and 21.

Referring for the moment, therefore, to Figs. 20 and 21, there is seen the shaft S—1 mounted in the bearings 53 formed in the brackets 54 (see Fig. 18).

Also mounted on the shaft S—1 may be seen the sleeve S—L, on which is rigidly journaled the operating arm G, which is adapted to be elevated by contact with the roller g mounted near the inner end of the skip S (see Fig. 2).

There is also a clutch connection between the sleeve S—L and the shaft S—1, which clutch operates after the sleeve has turned through its twenty-two and one-half degrees. There is a counter-weight 55 on this arm G, so that when the skip is lowered and the shaft S—1 returns to its normal position, the sleeve S—L will also return to its normal position to be in proper functioning condition for the next cycle.

On the end of the sleeve S—L, there is welded the arm x—5, to the outer end of which is connected the rod R—7 (see Fig. 18), on which is mounted an adjustable block B—1 having the cam face B—a, which contacts with the roller 56 mounted on the arm x—6 on the shaft S—2 (see Fig. 18) which, in turn, operates the water tank, as will shortly be described.

It will be seen, therefore, that the skip in raising from its lowered position will, through the arm G and the sleeve S—L, actuate the arm x—5 and the rod R—7 to, in turn, rock the shaft S—2, which shaft actuates the valves of the water tank W.

Now, on the hub of the lever x—5 is the aforementioned jaw clutch having the teeth 56a that cooperate with the teeth 56b of the opposing face of a jaw clutch, which are formed in the hub of the lever x—15, which lever, in turn, is keyed to the shaft S—1 to actuate the batch meter 13.

These teeth 56a and 56b, however, are so set that the sleeve S—L turns through twenty-two and one-half degrees before the teeth 56a contact with the teeth 56b of the opposing face of the clutch in the lever x—15. Now, the lever x—15, as may be seen in Fig. 18, has an adjustable face block 57 that operates the main control rod 58 of the batch meter 13, the operation of which will be described after the description of the shaft S—1 is completed.

Continuing, there is also mounted on the shaft S—1 the arm x—8, which is connected by the rod R—4 (Figs. 7 and 8), which rod R—4 is provided with the block B—2 with the cam face B—6 to contact with the roller 59 mounted in the arm 60, which is keyed to the aforementioned shaft S—3, which, it will be remembered, is a part of the automatic knock-out mechanism and has the finger x—16 fastened thereto, which will strike the block B—3 when it is in front of the arm to thereby actuate the lever C and thus close the discharge chute, if the discharge chute be open, and the block B—3 is in front of the finger x—16, as previously described.

Also fastened on the shaft S—1 (Figs. 20 and 21) may be seen the arm x—17, and to this arm is connected the rod R—18, on which there is mounted, at its lower end, a sleeve C—12 (Fig. 25) with an enlarged head C—13, the body of the sleeve passing through the elongated opening C—14 formed on the outer end of the arm x—28, which arm is mounted on the heretofore-mentioned shaft S—15, which shaft, it will be remembered, through the respective rods 18 and 28, throws into and out of operation the skip hoist clutch 8 and the afore-mentioned brake 9 for the skip hoist clutch.

When the shaft S—15 is operated by the main control lever A, as shown in Figs. 1, 5, and 6, the shaft S—15 is rotated (Fig. 5) and the arm x—28 (Fig. 25) will move downwardly, away from the sleeve head C—13, without affecting the rod R—18 with its sleeve C—12, but as the skip is elevated and rotates the sleeve S—L and the shaft S—1 (Fig. 20), the arm x—17 being keyed thereto will force the rod R—18 downwardly and, through the enlarged head C—13 of the sleeve C—12, will, through the arm x—28, rotate the shaft S—15 and, through the connecting rods 18 and 28, release the clutch 8 and apply the brake 9 of the skip hoist.

Water control

It will be remembered that as the skip starts to elevate, it rotates the sleeve S—L, just above described, which is mounted on the shaft S—I to, in turn, actuate the arm x—5 welded to the sleeve, which arm is connected by the arm R—7, on which, it will be recalled, is mounted the block B—I that contacts with the roller 56 on the arm x—6 to rock the shaft S—2 (Figs. 1 and 18).

Now, the shaft S—2 extends across the paver over to the side with the water tank W, which tank, except for a few changes, is shown and described in Patent Number 1,879,051, granted to George E. Blood, and for a full description, reference may be made to the aforementioned patent.

Explaining the same briefly, so that its connections with the automatic control will be understood, the tank consists of a cylinder 61, in which there is a piston head 62, that can be raised or lowered by the threaded shaft 63, on which there is the miter gear 64 meshing with its mate 65, which, in turn, is mounted on the shaft 66 operated by the sprocket chain 67 (see Fig. 2), which chain is actuated by the shaft 68, on which there is the hand wheel 69, which is on the same side of the machine as the levers A, B, C, D, etc. (see Figs. 1 and 2).

The shaft 68 actuates, in turn, a lead screw 70 (Fig. 1), on which there is a pointer 71, which is adapted to move in front of a calibrated plate 72, so that the position of the piston head 62 may be observed as it is elevated or lowered in the cylinder 61 to thus determine the capacity of the measuring tank.

The inlet for the tank may be seen at 73 leading into the pipe 74 and to the pipe 75, which latter pipe is connected at the top to an auxiliary tank 76.

Between the pipes 73 and 74, there is a valve 77, which is operated by the ball float 78 to cut off the supply after the auxiliary tank 76 is filled.

The pipe 75 is provided with two valve chambers 79 and 80 having the respective valves 79' and 80'. The valve 79' is connected, as at 79a, to the shifting bar R—9, and likewise, the valve 80' is connected, at 80a, about centrally of the said bar. The opposite end of the bar R—9 is connected, as at 83, to the rod R—8, which, at its upper end, is pivotally secured to the arm x—13 mounted on the shaft S—2, on the other end of which shaft, it will be remembered, are the two small arms x—6 and x—6', one of which is operated by the block B—I to rock the shaft S—2 and the other of the arms x—6' is connected to the water control lever B, as will be shortly described.

Now, when this shaft S—2 is rocked and the arm x—13 is moved upwardly, it will cause the valve 80' to rise off its seat and discharge the contents of the tank into the mixing drum through the discharge W—D that leads to the drum (not shown). At the same time, when the valve 80' is opened, the valve 79' is closed, so that only the measured quantity will be delivered to the mixing drum. On the other hand, when the shaft S—2 returns to its normal position and the rod R—8 lowers, as well as the forward end of the shifting bar R—9, it will close the discharge valve 80' and open the valve 79', so that the tank will quickly refill.

From this it will be seen that as the skip raises, it will force the block B—I upwardly to, in time, rock the shaft S—2 to thereby operate the valves of the water tank and discharge the water into the mixing drum during the elevation of the skip.

In Fig. 22, the discharge valve 80' is shown in its closed position, whereas in Fig. 23, the shaft S—2 has been rocked and the discharge valve 80' is now in its open position.

The block B—I on the rod R—7 is adjustable so that an exact timing of the rocking of the shaft S—2 can be set with relation to the elevation of the skip and the closing of the discharge chute, so that each batch of aggregates will have its supply of water.

It might be mentioned that the time required to discharge a full tank of water is approximately seventeen seconds, and the batch meter will be so arranged that the water control will be locked in a discharging condition for about twenty-one or twenty-two seconds, so that each batch of aggregates, when being mixed, will receive the measured amount of water.

Before explaining this locking mechanism, it will be noticed that the rod R—I (Fig. 18), on which the block B—I is fastened, extends for some distance above the shaft S—2 and has its upper end fitting within a forked rod 86 (see Fig. 1), which rod may slide within the bracket 87 and has its other end bent downwardly and fastened, at 89, to a throw-over lever 90, which is pivoted, as at 91.

The purpose of this construction is that should it be desired to throw out the water control for any reason, an upward movement of the throw-over lever 90 will force the rod R—7 to the right (Fig. 18), so that the block B—I will not be within the path of the arm x—6, and as the rod R—7 elevates, the block B—I, not contacting with the arm x—6, will not, in turn, rock the shaft S—2, which, it will be remembered, through the rod R—8 and R—9, operates the valves 79' and 80' of the water tank W.

On this shaft S—2, there is also the arm x—6', similar to x—6, which is connected to and actuated by the water control lever B, which is loosely mounted, it will be remembered, on the shaft S—14.

Lever B

Now, referring to Figs. 16a, 16b, 16c, 18 and 19, the rod R—3, as heretofore mentoned, is adjustably connected to the arm x—6' at its one end and extends through a guide 92 on a bracket 93 secured just above the batch meter. The opposite end of the rod R—3 is connected, as at 94, to the long rod 95, that extends over to one arm 96 of the bellcrank, which latter is pivoted, as at 97, while the other arm 98 of the bell-crank lever is fastened to the link 99, which, in turn, is secured to the water control lever B, as may be seen in Figs. 16a and 16c. The arm 96 of the bell-crank lever has the elongated slot 96' therein, in which the pin 96" fits, while directly back of the arm 96 is a pair of small lugs 100, between whch is pivoted a throw-over stop 101 to limit the stroke of the rod 95 and the rod R—3. When this throw-over stop 101 is thrown upwardly and out of the path of the arm 96, the water control lever B may be pulled out to its fullest extent and allow a latch L—I to drop in front of a stop 102 on the rod R—3, as will be shortly explained, but when the throw-over stop 101 is in the position shown in Fig. 16a, the water control lever B may be operated to rock the arm x—6, and likewise its shaft S—2, to thereby, in turn, operate the valves 79' and 80' of the water tank. However, it will not lock the water control in a set position only to be operated by the batch meter, as will shortly be described.

Locking the water control

Referring to the bracket 93 and the rod R—3, it will be seen that this rod R—3 has a hardened stop set on the rod, the stop being designated by the numeral 102. There will also be seen pivoted to the bracket, as at 103, the latch L—1, which, in turn, is to be lifted by an upward movement of the rod R—2, which has the elongated slot 104 in its upper end, through which passes the pin 105 set in the end of the latch L—1. The nose 106 of the latch L—1 is designed to drop in front of the adjacent end of the stop 102 when the rod R—3 is moved inwardly (Fig. 18), that is, to the left, by a rocking of the shaft S—2 caused, in turn, by a rocking of the shaft S—1, which, it will be remembered, is operated by an upward movement of the skip. Likewise, a manual operation of the water control lever B through the rod 95 and the rod R—3 will pull the rod R—3 to the left far enough to permit the latch L—1 to drop in front of the stop 102, provided the throw-over stop 101 is out of the path of movement of the arm 96. Thus, the water can be controlled both automatically by the elevation of the skip and manually by the water control lever B. It is often desirable, however, to flush out the drum and still not lock the water control in position, that is, only to be opened by the batch meter, as will be shortly explained, and by throwing the throw-over stop 101, a movement of the water control lever B will cause the rods 95 and R—3 to rock the shaft S—2 to turn on the water, but it will not permit the latch L—1 to drop down in front of the hardened face 102 as the stroke of R—3 is limited by the throw-over stop 101, as just explained. Thus, the operator can throw this stop 101 and flush the mixing drum at any time without locking the water control with relation to the batch meter.

Batch meter

The batch meter 13 is shown in detail in Fig. 18 and will be described briefly.

It is essentially the batch meter shown in the patent of Charles E. Foote, Number 1,419,451, heretofore mentioned.

Generally speaking, there is a drive shaft 107 with its pinion 108, that is operated by one of the ring gears 3 on the mixing drum, which shaft 107 is provided with a worm 109 to operate the worm gear 110. The gear 110 operates the shaft 110' and pinion 111, which, in turn, meshes with the gear 112 mounted on the shaft 113, on which shaft there is the pinion 114, which pinion is designed to be thrown into and out of mesh with the sector 115, which is pivoted, at 116, in the batch meter. The gear 112 and pinion 114 with their shaft 113 are carried in the housing arms 117, to which is fastened the rod 118, which, in turn, passes through the adjustable lug 119, which latter is secured to the main rod 58 of the batch meter. There is a spring 120 located between the adjustable lug 119 and the washer 121 on the rod 118, so that an inward movement of the rod 58 will cause the pinion 114 to swing into mesh with the gear segment 115 and slowly elevate the same.

There are a number of apertures 122 in the segment 115, in any one of which may be placed a pin 122', so that as the segment rises after so many seconds or revolutions of the mixing drum and the worm shaft 107, this pin 122' will strike the trigger arm 123, which is pivoted, at 124, and carries the trigger finger 125, that will slip from the notch 126 when the rod 58 is pushed inwardly at the time it is forced by the plate 57 mounted on the arm x—15, which, it will be remembered, is, in turn, actuated by the clutch 56a—56b and the sleeve S—L. Thus, when the segment 115 is raised, as heretofore mentioned, it will contact with the arm 123 and raise the same and lift the finger 125 from the notch 126 and permit the spring 120 to force the rod 58 back to its normal position. The rod 58 is then in position to be operated again when the sleeve S—L is turned by the upward movement of the skip. When the rod 58 goes back to its normal position, the segment 115 will drop to the position shown in Fig. 18 and the small pinion 114 will not be in mesh with the teeth of the sector 115 until the rod 58 is again forced inwardly by the elevation of the skip. By placing the pin 122' in a higher or lower aperture, the time for the operation of the batch meter is regulated.

In Fig. 18, the latch L—1 is shown above the stop 106, but it will be understood that when the skip elevates and the shaft S—1 is rocked, likewise when the block B—1 contacts with the arm x—6 and rocks the shaft S—2, it will move the rod R—3 and its hardened stop 106 beyond the nose of the latch L—1, and the latch L—1 will drop and prevent the rod R—3 from returning until such time as the rod R—2, connected with the segment 115, has raised, so that the pin 105 will finally engage the lower end wall of the slot 104, that is, after the requisite number of seconds, and lift the latch L—1 and let the spring 127, which is fastened on the far end of the shaft S—2 (see Fig. 22) rock the shaft S—2 back to its normal position and cut off the water discharge, that is, close the valve 80' and open the valve 79' of the water tank.

It will be understood that when the latch L—1 once gets behind the stop 106, the operator cannot use the manual water control lever B until such time as the batch meter has gone through its set number of revolutions.

Still referring to Fig. 18, it will be seen that the main control rod 58 is connected at its one end to the rod R—14, which extends upwardly along the drum and directly in back of the levers A, B, and C, as the power discharge is to be automatically locked during the mixing of the aggregates and cannot be even manually operated until such time as the batch meter has completed its certain set number of revolutions.

It might be mentioned that batch meters are provided primarily to lock the discharge chute after the aggregates enter the drum, until the requisite number of turns or the required number of seconds have elapsed, which time limit is arranged by the laws of the different States.

Now, R—14, that is, the rod connecting with the batch meter, has a short arm x—18 (see Fig. 24) provided with the pin 128, that is designed to fit behind the roller 129 formed at the outer end of a small inwardly extending bracket 130 formed on the inner face of the power discharge lever C.

Thus, when the batch meter rod 58 is in its normal position, as shown in Fig. 18, that is, before being operated by the arm x—15, forcing it inwardly, the pin 128 on the arm x—18 mounted on the rod R—14 will not be behind the roller 129 and the lever C could be manually operated to open or close the discharge chute. However, after the skip is elevated through its first twenty-two and one-half degrees, it will be remembered that the arm x—15 will force the rod 58 of the batch meter inwardly and set the batch meter into operation and will, at the same time, lock the power discharge lever C against manual operation until such time as the rod 58 is again returned and the mixing drum has turned through the set time period.

Thus, it will be seen that the batch meter not only locks the discharge chute against operation during the mixing of the aggregates in the drum, but it also locks the water control from manual operation, so that the water tank will be sure to discharge the set contents into the drum.

The mechanism in the batch meter for ringing the bell and registering the number of batches has not been described, but a description of this may be found in the batch meter patent, if so desired.

This completes the description of the parts of the automatic control, as well as the parts for the operation of the skip hoist, water control, and power discharge.

The boom swing and bucket drive are both manually controlled from levers on the shaft S—14 and do not enter into the automatic operation, so that but a short description of their operation follows.

Bucket drive

From Fig. 15, it will be seen that the next hand-lever control, mounted on the shaft S—14, is the lever D, this lever being loosely mounted on the said shaft. Connected with the lever is the rod R—12, which, in turn, is secured to the arm x—14, which arm is mounted on the shaft S—151. This shaft S—151 has secured thereto the arm x—12 connected by the rod R—5 to the arm x—7 to, in turn, operate the clutch C—3. This clutch C—3 is mounted on a power shaft S—12, so that when the handle D is pulled forwardly, the power shaft S—12 will rotate the pinion C—4 of the clutch C—3 in the direction of the arrow. This, in turn, meshes with the gear C—5 mounted on the shaft S—13.

On this shaft S—13 is mounted the cable drum C—8, about which is wound the cable C—9, which, in turn, passes down over the sheaves C—10 (see Fig. 3) to the sheaves C—11, and then outwardly along the boom, the bights of the cable being connected to the trip mechanism of the bucket, so that when the cable drum C—8 is rotated in the one direction, it will draw the bucket outwardly along the boom in the well-known manner, and when the drum is reversed, it will pull the bucket inwardly of the boom.

Now, for reversing the direction of the bucket, there is also associated with the other side of the clutch C—3 the sprocket wheel C—6 to drive the sprocket C—7 by a chain, which sprocket is also mounted on the shaft S—13, so that should the handle D be forced inwardly, it will, through the rod R—5, force the arm x—7 upwardly and throw the spanner to cause the opposite face of the clutch to engage and drive the sprocket wheel C—6 and C—7 in the direction of the arrow to thus reverse the rotation of the cable drum C—8.

Thus, the operator by forcing the lever D away from himself will drive the cable drum C—8 in the one direction and the bucket inwardly of the boom, while a pulling of the lever D towards him will drive the cable drum C—8 in the opposite direction and cause the bucket to be pulled forwardly along the boom.

It will be understood that the necessary bearings and brackets and connections are present, but need not be described in this application.

Finally, mounted on the shaft S—14 is the lever E, which is connected by the rod 131 to operate a clutch 132, which is diagrammatically shown in Fig. 2, and to operate a sector (not shown) for traversing the boom.

Thus, it will be seen that there are five control levers, A to E, inclusive, for handling the aggregates from the time they enter the skip until the time they are deposited on the sub-grade in the desired location from the bucket.

There is also the one other arm F that is mounted on the shaft S—14 but is not hand-operated, it being keyed to the shaft S—14 and operated by the movement of the lever C, which is likewise keyed to the shaft S—14.

Having described the essentials of the invention, and inasmuch as a number of automatic actions take place, a short review of the operation is thought desirable.

Operation

The operation first will be predicated on the assumption that the machine is to be started with the mixing drum empty and that the power discharge chute 6 has been left open. The aggregates will be dumped into the skip and the handle A pulled from the position shown in Fig. 5 to the position shown in Fig. 6.

Inasmuch as the discharge chute is open, the sliding pin S—10 in the bracket 39 of the lever C (Fig. 7) will be in the position shown in detail in Figs. 13 and 14, and the block B—3 will be in front of the slide x—16b and its nose x—16c, which slide x—16b is operated by the finger x—16. Therefore, when the lever A is operated, the block B—3, being in front of the finger x—16, the lever C is not moved, as, although the lever A has actuated the arm x—10 and its sleeve 36 and, therefore, the finger x—11, the block B—3 not being in front of the said finger and slide x—11b, there is nothing to force the handle C outwardly. Therefore, the discharge chute will still remain in its open position.

Now, for the moment omitting the operation of the batch meter and the turning on of the water, and remembering that the skip is elevating, the arm G, being raised, will rock the sleeve S—L and after passing through twenty-two and one-half degrees will rock the shaft S—1, on which is the arm x—8 connected by the rod R—4, and as this arm x—8 and rod R—4 continue to lower (Figs. 1 and 8), the block B—2 mounted on the end of the rod R—4 will slowly rock the shaft S—3 in an anti-clockwise direction (Fig. 8), and in so doing, will rock the finger x—16 forwardly and the block B—3, being in front of this finger, will push the lever C outwardly, the same as if it had been actuated by hand.

The lever C is keyed to the shaft S—14, and likewise is the short arm F keyed to the shaft S—14, so that when the short arm F is moved outwardly, to which, it will be remembered, is connected the rod 49, and as the rod 49 is moved outwardly, it will pull the roller 46 out of the notch 45 in the planetary disc 43 and let the disc revolve until the notch 44 will be engaged by the roller 46. The eccentric 42 with its rod 40 will lower, swinging the chute to a non-discharging position, and force the lower end of the arm H downwardly from the position shown in Fig. 4, thus forcing the link 52 upwardly and the arm 52a upwardly to revolve S—4 in a clockwise direction and the short link S—5 in a clockwise direction, thus shooting the pin S—10 from the position shown in Fig. 13 to the position shown in Fig. 9, when the discharge chute is closed. It will be remembered that the pin S—10 carries the block B—3, so we now have the block B—3 over in front of the slide x—11b, which slide, in turn, is always operated by the finger x—11, which is mounted on the sleeve 36, which sleeve is actuated when the lever A is pulled.

The above description does not take into consideration all of the automatic functions, but is simply to show how the discharge chute would automatically be closed by a partial elevation of the skip if the discharge chute was open, which was the presumption.

The cycle can now be described with the skip on the ground and the discharge chute closed and a batch of aggregates in the mixing drum.

Elevation of skip

The lever A will again be grasped by the operator and pulled towards him, and as the small finger lever L—6 is not grasped, the pawl L—4 will rock the arm x—10 on the sleeve 36 to start the automatic mechanism in operation.

The movement of the lever A has also, through the rod 16, rocked the shaft S—15 (Fig. 1) just below the platform, and this rocking of the shaft S—15, through the arm 18a and the rod 18, has released the brake 9 connected with the skip hoist drum 7. At the same time, the rocking of the shaft S—15, through the arm 27 and the rod 28, has operated the spanner 30 of the clutch 8 and the power shaft 24 may now, through the gearing 25 and 26 of the skip hoist drum 7 and through the cable 10, elevate the skip.

Turning on the water

As the skip starts to elevate, the roller g carried thereby will actuate the arm G, which arm, it will be remembered, is mounted on the sleeve S—L which, in turn, is mounted on the shaft S—1 (Figs. 1 and 2). As the sleeve S—L is partially rotated in an anti-clockwise direction (Fig. 18), the arm x—5 welded thereto raises the rod R—7, which has the block B—1 thereon, and, through the arm x—6, rocks the shaft S—2. The block B—1, however, is set far enough down the rod R—7, so that the shaft S—2 will not be completely rocked until the new batch of aggregates in the skip are being discharged into the drum.

As it will be remembered that the shaft S—2 extends across the machine to the water tank and through the arm x—13 thereon and the rod R—8, a rocking of the shaft S—2 will force the arm x—13 upwardly to raise the arm R—8 and, through the shifting bar R—9, will open the discharge valve 80' and close the intake valve 79', thus admitting the requisite number of gallons of water to the new batch of aggregates pouring into the mixing drum. In the meantime, the previous batch has been discharged from the mixing drum, as will be later mentioned.

Locking the water control and actuating the batch meter

When the shaft S—2 for the water is actuated by the rising of the rod R—7 and the block B—1, the arm x—6' on the shaft S—2 forces the rod R—3 (Fig. 18) to the left, and in doing so, the stop 102 beyond the nose 106 of the latch L—1, permitting the latch to drop down, so that until this latch L—1 is again raised, it will be impossible to move the rod R—3 by a movement of the water control handle B and the rod 95, which connects through the bell-crank lever to the water control lever B and to the rod R—3.

As the skip continues its upward movement and rocks the sleeve S—L after passing through twenty-two and one-half degrees, it will be remembered that the teeth 56a (Figs. 20 and 21) cooperate with the teeth 56b, that is, the clutch formation between the sleeve S—L and the shaft S—1, and the lever x—15 keyed to the shaft S—1 (Fig. 18) will cause the adjustable face block 57 to actuate the main control rod 58 of the batch meter to throw the gearing train into mesh with the sector 115 to elevate this sector throughout the desired number of seconds. As the sector rises, it will raise the rod R—2 and eventually the bottom of the slot 104 will contact the pin 105 in the latch L—1 and start to raise the same, and will, according to the time set, then lift the latch L—1 to unlock the water rod R—3.

The spring 127 (Fig. 22) will return the shaft S—2 to its normal position, which will, through the rod R—8 and the rod R—9, close the discharge valve 80' and open the inlet valve 79'.

Should it be desired to flush the tank by manually operating the water control lever B and not lock it in position, the small throw-over stop 101 will be thrown into position, as shown in Fig. 16a, to limit the stroke and permit a flushing of the tank without locking the water discharge, which could then only be released by the action of the batch meter.

After the rod R—3 returns to its normal position, the latch L—1 will again rest on the stop 102 until the batch meter is again operated.

When the rod 58 of the batch meter is actuated, the rod R—14 that passes behind the levers A, B, and C is also forced to the left, so that the pin 128 on the arm x—18 (Fig. 24) engages the lever C and holds it locked, and the power discharge cannot be operated until the batch meter has completed its time cycle.

After the completion of the cycle, the rod 58 of the batch meter will be forced back to its normal position to thereby unlock the lever C.

It will be remembered that upon explaining the operation of the machine, the presumption, first, was that the discharge chute was open, and then followed a description showing how the chute was closed. The description then continued with the skip being elevated to turn on the water, as just above outlined.

Opening discharge chute

Also, when the handle A was actuated to raise the skip the second time so that the operation just outlined took place, the discharge chute was automatically opened, as the handle A, when pulled, caused the small pawl to engage the arm x—10 on the sleeve 36 (Fig. 7), and as the block B—3 on the pin S—10 was in front of the finger x—11 (Fig. 10), which it has to be when the chute is closed, a movement of the handle A and the sleeve 36 actuated the finger x—11 of the automatic knock-out mechanism and caused an outward movement of the lever C, which it will be remembered, was keyed to the shaft S—14 to thereby rock the short arm F, which pulled the rod 49 and the roller 46 out of the notch in the disc 43 of the planetary and caused the connecting rod and eccentric to assume the position shown in Fig. 4 to open the chute. In doing so, the stop 51 (Fig. 4) has raised the outer end of the arm H and pulled down on the link 52, rotated the shaft S—4 in an anti-clockwise direction, and shot the pin S—10 with its block B—3 over to the left to the dotted line position, as shown in Fig. 13, so that the block B—3 with the discharge closed and will remain in a locked position until the batch has been mixed for the predetermined period of time. It will also be seen that the water is automatically turned on and off and the control is locked against movement until such time as the tank has had full time to discharge into the drum.

By careful arrangement and adjustment of the parts, the water control may be locked in an open position for twenty-two seconds, although the time to discharge a full tank of water is approximately seventeen seconds.

As a rule, the mixing drum may be emptied in seven and one-half seconds and the skip raised to a dumping position in eight and one-half seconds.

These actions are timed so that the discharge is completed just prior to the emptying of the unmixed aggregates into the drum.

As a rule, one minute and twenty-five seconds are required for a thorough mixing operation and the timing elements can be so adjusted that the continuous operation of the machine is such that the concrete can be discharged into the drum, mixed, and discharged therefrom in a minimum amount of time.

It will be appreciated that it is very desirable to have an automatic mechanism of this kind, so that the operator, on a movement of one lever, will cause the machine to go through a complete cycle with the timing of the operation mechanically arranged for, rather than depending on the skill of the operator.

The control mechanism, although consisting of a number of parts, is one that may be readily and easily applied to the form of concrete paver shown and, after once being adjusted, will give efficient service throughout the life of the machine.

Having thus described my invention, what I claim as new and desire to secure by Letters Patent is:

1. In an automatic control for concrete pavers, levers for manually affecting the skip, for turning on and off the water supply, and for opening and closing the power discharge chute, the last of said levers carrying a knock-out mechanism comprising a movable block mounted on a sliding pin, said pin indirectly connected to the power discharge chute and moved with the opening and closing of said chute, a sleeve operated by the lever for controlling the skip, said sleeve provided with a finger for contacting said block when in front of the said finger to thereby open the discharge chute, a shaft with a finger for contacting the said block for closing said discharge chute when the block is in front of said last-mentioned finger, and the said shaft operated by the elevation of said skip.

2. In an automatic control for concrete pavers having a skip and a power-operated discharge chute; a shaft, a control lever loosely mounted on the shaft for operating the skip, a power discharge lever fixedly secured to said shaft, and a second lever fixedly secured to said shaft connected directly to the control of the power discharge chute, a sliding pin carried by the power discharge lever for the discharge and connected with said power discharge chute, the pin being in an inner position when the discharge chute is closed and in an outer position when the discharge chute is open, a block carried on said pin, the power discharge lever operated by a movement of the skip lever when the pin and block are in the one position and also operated by the elevation of the skip when the pin and block are in the other position.

3. A knock-out mechanism for concrete pavers including in part a shaft and a sleeve, a finger on said shaft and a finger on said sleeve, a block movable in front of the respective fingers and said block connected with the control mechanism of the discharge chute of the paver whereby the block will be in front of one finger when the chute is open and in front of the other finger when the chute is closed, the sleeve connected with and controlled by the elevation of the skip and the shaft connected with and controlled by the movement of the control lever.

4. In an automatic control for concrete pavers having a power-operated skip and a power-operated discharge chute; a control lever for manually opening and closing the discharge chute, a lever for manually controlling the elevation of the skip, sliding means indirectly connected with the chute and carried by the discharge control lever, said sliding means when in one position affected by the elevation of the skip and when in the other position automatically affected by the manual operation of the lever controlling the elevation of the skip.

5. An automatic knock-out mechanism for affecting the discharge chute of a concrete paver, said mechanism including a lever for the discharge chute and a lever for the skip control, a shaft, a sleeve thereon, said shaft and said sleeve being provided, respectively, with a finger, a sliding pin carrying a block movable in front of the respective fingers, said block adapted to automatically operate the control lever for the discharge chute, the shaft and its finger operated by the elevation of the skip, the sleeve and its finger operated by a control lever for the elevation of the skip, the control lever for the skip operating the shaft and the knock-out mechanism when the chute is in a closed position, and the elevation of the skip affecting the sleeve and the knock-out mechanism to close the discharge chute.

6. In an automatic control for concrete pavers having a skip, a discharge chute, a water supply, means for elevating the skip, a main lever for controlling the means for elevating the skip, a lever for controlling the operation of the discharge chute, interconnected knock-out mechanism between the two said levers, a timing shaft interconnected with the means for elevating the skip and with the lever for operating the discharge chute, a batch meter also interconnected with the timing shaft whereby a movement of the main control lever will elevate said skip and open said discharge chute if closed, the said timing shaft starting the batch meter and also controlling the stopping of the skip as it approaches its uppermost limit of travel and also closing said discharge chute, and the batch meter locking the discharge chute in its closed position.

7. In an automatic control for a concrete paver having a skip, a main control lever for controlling the elevation of the skip, a discharge chute and a lever for controlling the opening and closing of the discharge chute, interconnecting knock-out mechanism between the two said levers, a timing shaft operated by the elevation of the skip, said timing shaft also connected with the knock-out mechanism whereby the main control lever will operate the discharge chute control lever if the discharge chute is closed when said skip starts to elevate, said knock-out mechanism not affected if said discharge chute is open, said knock-out mechanism also closing said discharge chute open is now over in front of the finger x—16 and its slide x—16b to be automatically closed by the rising of the skip after a partial elevation.

Therefore, as the skip is being elevated and before the water is turned on and before the batch meter starts to operate by a partial elevation of the skip, the discharge chute has been opened, so that the first batch put in that was described with the chute being in an open position can be discharged into a bucket on the boom, if so desired. Before the skip has delivered the second batch of aggregates to the mixing drum, it is necessary that the discharge chute be again closed, so that the batch being delivered from the skip and the water discharged into the drum will be thoroughly mixed according to the time set by the batch meter.

It has just been described how a turning of the sleeve S—L and shaft S—1 actuated the water control and turned on the batch meter (Fig. 20). Also on this shaft S—1, it will be remembered, is, the arm x—8, which is connected by the rod R—4, on which is the block B—2 to contact with the roller 59 on the arm 60 to actuate the shaft S—3 of the knock-out mechanism.

As the shaft S—1 is rocked, the arm x—8 (see Fig. 18), mounted on the shaft S—1, is moved downwardly to pull the rod R—4 downwardly, this, in turn, to partially rotate the shaft S—3 through the arm 60 (Fig. 8).

On the outer end of the shaft S—3, it will be remembered, is affixed the finger x—16 and, as heretofore mentioned, inasmuch as the chute is now open, the block B—3 on the sliding pin S—10 is in front of the finger x—16 and its slide x—16b. Therefore, this rocking of the shaft S—3 will now cause the slide to push against the block B—3 and force the discharge chute control lever C again outwardly.

The outward movement of the lever C will actuate the short arm F, and in a like manner, again pull the rod 49 outwardly, allowing the planetary disc to rotate half-way and further pull the discharge chute to a closed position, and in so doing, through the rocking of the shaft S—4 (Fig. 4), shoot the pin S—10 with its block B back in front of the finger x—11, while the skip continues to rise and deliver the batch to the mixing drum.

As far as the description has proceeded, it will be seen that it first proceeded on the assumption that the discharge chute was open and then followed an explanation of how the automatic mechanism closed it. The cycle was explained with the discharge chute closed, how it was opened when the handle A was operated through the automatic knock-out mechanism, and then how the continued elevation of the skip again closed the discharge chute before the new batch of aggregates entered the drum and before the water was turned on. It has also been explained how the batch meter locks the handle C until such time as the batch meter has completed its predetermined time cycle and how the water control was locked until the batch meter had completed its cycle.

It remains to be explained how the power for the elevation of the skip is cut off when the skip reaches its peak and the brake is applied. It will be remembered that there is the arm x—17 keyed to the shaft S—1 (Fig. 20), and as the shaft S—1 rotates by the movement of the arm G caused by the elevation of the skip, it will force the arm x—17 downwardly, and likewise, the rod R—18 downwardly, on which, it will be remembered, there is the sleeve C—12 fitting in the elongated slot C—14 of the arm x—28 on the shaft S—15 (Fig. 1). As this shaft S—15 is rotated, it lowers the rod 28 to actuate the spanner of the clutch 8 to release the same, which clutch, it will be remembered, actuates the skip hoist drum 7 and, at the same time, through the rod 18, as heretofore mentioned, applies the brake 9.

To lower the skip, the operator will then move the lever A very slightly forward and backward (grasping the finger lever), so that the brake may be momentarily disengaged and thus let the skip slowly return to the ground by gravity.

All the parts are then again in their normal position with the discharge chute closed, the water turned off, the skip on the ground and the block B—3 on the sliding pin S—10 back in front of the finger x—11 mounted on the shaft 36, so that a movement of the lever A will send the paver through another similar cycle.

*Manual control of skip*

Should it be desired for any reason to cut out the automatic mechanism and, at the same time, raise the skip, it will be understood that the finger lever L—6 on lever A will be grasped when lever A is pulled, causing the pawl L—4 to miss the arm x—10 on the sleeve 36. This would cause the skip to elevate by throwing in the skip hoist drum clutch 8 and releasing the brake 9, but the movement of the lever A would not affect the automatic knock-out mechanism or open the discharge chute.

The water control could be thrown out of action by throwing over the handle 90, so that the block B—1 would not actuate the shaft S—2.

The batch meter, however, would be thrown into operation and the power discharge handle C locked until the cycle is completed.

The control for the water can be manually actuated by a movement of the lever B and locked with relation to the batch meter, if desired, or the throw-over stop 101 thrown in front of the bell-crank arm 96 would permit a flushing of the tank without locking the water control with relation to the batch meter.

The power discharge lever C may be manually actuated at any time except during an operation of the batch meter, which, it will be remembered, locks the lever C until the batch has been mixed the required number of seconds.

The bucket drive is always manually operated through the lever D, which has been previously explained, and consists of simply rotating the drum C—8 in either one of two directions by the operation of the clutch C—3. The boom may be swung by an operation of the lever E, which per se forms no part of the present invention.

From the foregoing, it will be seen that I have provided an automatic control arrangement whereby on the operation of the one lever A, if the discharge chute is in an open position, it will not be affected by the movement of the lever A. However, after the skip has elevated through a certain number of degrees to pour in a new batch of aggregates, the discharge chute will be automatically closed. On the other hand, if the discharge chute is closed, an operation of the lever A will open the discharge chute until such time as the skip has elevated through a certain number of degrees and, just before the aggregates are discharged into the drum and the water is turned on, the discharge chute will be automatically chute as the skip approaches its uppermost limit of travel, a batch meter for controlling the locking of the discharge chute and a water supply; both of which are connected with and controlled by the timing shaft, and means also connected with the timing shaft for stopping the skip as it approaches its upward limit of travel.

8. An automatic control for a concrete paver having a discharge chute, a skip, and a water supply, a main lever control controlling the upward movement of the skip, a second lever for operating the discharge chute, interconnected knock-out means between the two said levers for opening the chute if closed and not affecting the discharge chute if opened when said skip is in its lowermost position, a timing shaft also interconnected with the skip and with the knock-out mechanism for closing said discharge chute as the skip approaches its uppermost limit of travel, a batch meter for locking the discharge chute and a water supply; both of which are started in operation by the said timing shaft.

9. In a control for a concrete paver, a main timing shaft actuated by the raising of the skip, a discharge chute control mechanism connected with said timing shaft, a batch meter control mechanism connected with said timing shaft for locking the discharge chute, a water control mechanism connected with said timing shaft, a knock-out mechanism connected with the discharge chute control mechanism and partially operated by said timing shaft, and a main control lever for controlling the elevation of the skip and also interconnected with said knock-out mechanism for opening said chute if closed when said skip starts on its upward movement.

10. An automatic control for concrete pavers having a skip, a discharge chute, and a water supply, a lever for controlling the elevation of the skip, a lever for controlling the opening and closing of the discharge chute and interconnecting means between the two levers whereby the discharge chute lever will be actuated by a movement of the skip lever provided the discharge chute is closed, a main timing shaft, the movement of the skip operating said timing shaft, said timing shaft closing said discharge chute which resets the knock-out mechanism, turning on the water supply, and stopping the skip, and a batch meter also operated from said timing shaft and locking the discharge chute and water supply for a certain period of time during the mixing of the aggregates.

11. An automatic control for concrete pavers having a skip and a discharge chute, a lever for controlling the elevation and lowering of the skip, a lever for opening and closing the discharge chute, automatic knock-out mechanism extending between the two levers whereby an operation of the skip lever will aso operate the discharge lever to open the discharge chute if closed but not affecting the discharge lever if the chute is open, said automatic knock-out means also indirectly connected with the skip whereby on a raising of the skip it will operate the discharge lever to automatically close said chute and reset the knock-out mechanism, and means also connected with the skip for stopping the skip as it approaches its uppermost limit of travel.

12. An automatic control for concrete pavers having a skip and a discharge chute, a lever for controlling the elevation and lowering of the skip, a lever for opening and closing the discharge chute, automatic knock-out mechanism extending between the two levers whereby an operation of the skip lever will also operate the discharge lever to open the discharge chute if closed but not affecting the discharge lever if the chute is open, said automatic knock-out means also indirectly connected with the skip whereby on a raising of the skip it will operate the discharge lever to automatically close said chute and reset the knock-out mechanism, means also connected with the skip for stopping the skip as it approaches its uppermost limit of travel, a water supply, and a batch meter connected indirectly to the skip and the discharge chute, the batch meter locking the discharge chute against operation and locking the water supply in a discharging condition during a desired period of time.

13. An automatic control for regulating the movement of the skip of a paver, the discharge chute of the paver, and for turning on the water supply of a paver, including a main control lever for operating the skip, a lever for operating the discharge chute, and an interconnected knock-out mechanism between said levers, said knock-out mechanism also connected indirectly to the skip, a batch meter, means controlled by the raising of the skip for operating said knock-out mechanism to close said chute and for turning on the water supply and for setting the batch meter into operation, the said batch meter locking the discharge chute against operation and locking the water supply in a discharging position, and control means also affected by the skip for stopping the skip as it reaches its upward limit of travel.

14. In an automatic control for a concrete paver having a skip and a discharge chute, a main operating lever for elevating the skip, a knock-out mechanism connected with the discharge chute and indirectly to the skip, the main operating lever also controlling the knock-out mechanism provided the discharge chute is closed, a timing shaft operated by the upward movement of the skip and also connected with said knock-out mechanism for closing the chute after the skip has partially raised, and a closing of the chute resetting said knock-out mechanism, a batch meter, said timing shaft cooperating with the batch meter to also start said batch meter, said batch meter, in turn, locking the discharge chute in a closed position for a set period of time, a water supply, said batch meter also locking the water supply when in a discharging position, said timing shaft connected with the water supply to turn on the same and also arranged to halt the skip as it approaches its upward limit of travel.

15. In an automatic control for a concrete paver having a skip and a discharge chute, a batch meter, a water supply, a timing shaft connected with and operated by the elevation of the skip, a main control lever, a lever connected to the discharge chute for operation of the same, a knock-out mechanism interconnected between the main lever and the lever connected with the discharge chute, the timing shaft also connected to the knock-out mechanism, the main control lever elevating the skip and operating the knock-out mechanism to actuate the discharge chute lever when the chute is in closed position, and a closing of the chute resetting the knock-out mechanism, said timing shaft also connected to and actuating the batch meter, the timing shaft connected with and actuating the said water supply, said batch meter locking the discharge chute against opening for a set period of time and also locking the water supply in a discharging position, said timing shaft also cooperating with the main control lever for stopping the skip as it approaches its uppermost limit of travel.

16. In an automatic control for a concrete paver having a skip and a discharge chute, a water supply, a batch meter for controlling the locking and unlocking of the discharge chute, a knock-out mechanism for the discharge chute, a timing shaft operably connected to said skip, said timing shaft also operably connected with and adapted to turn on the water supply, a clutch on said timing shaft, the timing shaft also operably connected to said batch meter and said clutch permitting the timing shaft to rotate through a predetermined number of degrees before throwing said batch meter into operation, said timing shaft also operably connected with said knock-out mechanism and the said knock-out mechanism closing the discharge chute if open as the skip nears its discharging position and a closing of the chute resetting the knock-out mechanism, and means also connected to said timing shaft to stop the elevation of the skip and retain it in its uppermost position until lowered by manual control.

17. In a control mechanism for elevating the skip of a concrete paver, for turning on and off the water supply, and opening and closing the discharge chute, including a timing shaft, a batch meter for locking the discharge chute against movement, and a knock-out mechanism, a main control lever for controlling the movement of the skip and the timing shaft operated from the movement of said skip, the knock-out mechanism also associated with the main control lever and discharge chute, means for locking out the knock-out mechanism when said main control lever is operated, and the timing shaft operating said batch meter and turning on said water supply even though said knock-out mechanism is locked out.

18. In an automatic control for concrete pavers having a skip, a water supply, and a discharge mechanism, a main control lever, means for elevating the skip operated by said main control lever, a timing shaft operated by the elevation of the skip, said timing shaft connected with the water supply for turning on the same, a knock-out mechanism operably connected with the discharge mechanism and also with said timing shaft, said knock-out mechanism causing an opening and closing of said discharge mechanism as said skip is elevated, a batch meter also operably connected with the timing shaft for locking the water control in an open position and the discharge mechanism in a closed position during the mixing of the aggregates in the paver, and the timing shaft returning to its normal position as said skip is lowered.

19. In an automatic control for concrete pavers having a skip, a discharge chute, and a water supply, a batch meter for locking the discharge chute in a closed position for a set period of time, a finger and latch mechanism operated by the batch meter and connected with the water supply for locking the water supply in a discharging position substantially during the time that the discharge chute is held in a locked position, means for locking out said finger and latch, and means for independently operating said water supply at all times except when locked by said batch meter.

20. In combination, a concrete paver having a skip and a discharge chute, a lever for controlling the skip and a lever for controlling the discharge chute, a knock-out mechanism interconnected with said levers whereby an operation of the skip lever will operate said discharge chute lever if the discharge chute is closed, a timing shaft connected with the skip and also connected with the knock-out mechanism for closing the discharge chute as the skip rises, a batch meter, a water supply, the timing shaft turning on the water supply and the batch meter locking the water supply in an open position and the discharge chute in a closed position, and means connected with the discharge chute for resetting the knock-out mechanism on a closing of the chute.

21. An automatic control for regulating the movement of the skip of a paver, the discharge chute of a paver, and for turning on the water supply of a paver including a main control lever for operating the skip, a lever for operating the discharge chute, and an interconnected knock-out mechanism between said levers, a batch meter, a main timing shaft controlled by the raising of the skip and cooperating with said knock-out mechanism to close said chute and for turning on the water supply and for setting the batch meter into operation, the said batch meter locking the discharge chute against operation and locking the water supply in a discharging position, and control means also operated by the skip for stopping the skip as it reaches its upward limit of travel.

AXEL E. LUNDBYE.